United States Patent
Tamaki

(10) Patent No.: US 9,454,035 B2
(45) Date of Patent: Sep. 27, 2016

(54) TRANSFLECTIVE DISPLAY DEVICE, ELECTRONIC APPARATUS, AND METHOD OF DRIVING TRANSFLECTIVE DISPLAY DEVICE

(71) Applicant: Japan Display Inc., Tokyo (JP)

(72) Inventor: Masaya Tamaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 43 days.

(21) Appl. No.: 14/049,852

(22) Filed: Oct. 9, 2013

(65) Prior Publication Data

US 2014/0125933 A1    May 8, 2014

(30) Foreign Application Priority Data

Nov. 5, 2012  (JP) .................................. 2012-243692

(51) Int. Cl.
*G02F 1/1335*    (2006.01)
*G02F 1/139*    (2006.01)
*G09G 3/36*    (2006.01)

(52) U.S. Cl.
CPC ....... *G02F 1/133555* (2013.01); *G02F 1/1396* (2013.01); *G02F 1/133553* (2013.01); *G09G 3/3614* (2013.01); *G09G 3/3648* (2013.01);
(Continued)

(58) Field of Classification Search
CPC .................. G02F 1/133555; G02F 1/133553; G02F 1/1396; G02F 1/133371; G09G 3/3614; G09G 3/3648; G09G 2300/0456; G09G 2300/0857
USPC ........................................................ 349/114
See application file for complete search history.

(56) References Cited

U.S. PATENT DOCUMENTS

2007/0177082 A1*  8/2007  Imayama .......... G02F 1/133555
                                                  349/114
2009/0102751 A1*  4/2009  Takatoku ............. G09G 3/3659
                                                    345/55

(Continued)

FOREIGN PATENT DOCUMENTS

JP    2003-121865    4/2003
JP    2003-202594    7/2003

(Continued)

OTHER PUBLICATIONS

Japanese Office Action issued Jan. 20, 2015 in corresponding Japanese Application No. 2012-243692.

(Continued)

*Primary Examiner* — Nathanael R Briggs
*Assistant Examiner* — William Peterson
(74) *Attorney, Agent, or Firm* — K&L Gates LLP

(57) ABSTRACT

According to an aspect, a transflective display device, includes a first substrate on which a first orientation film and a plurality of reflective electrodes formed for each of pixels are provided; a second substrate on which a second orientation film and a transparent electrode that is opposite to the reflective electrodes are provided; and a liquid crystal layer including a plurality of liquid crystal molecules provided between the first substrate and the second substrate. A direction of long axis of the liquid crystal molecules is parallel to surfaces of the first and second orientation films and twisted between the first substrate and the second substrate. The reflective electrode is configured to perform reflective display, and a space between the reflective electrodes of the adjacent pixels is configured to perform transmissive display.

15 Claims, 27 Drawing Sheets

(52) U.S. Cl.
CPC .............. *G09G 2300/0456* (2013.01); *G09G 2300/0857* (2013.01)

(56) References Cited

U.S. PATENT DOCUMENTS

2009/0262288 A1* 10/2009 Tsuchiya ..................... 349/114
2011/0102723 A1* 5/2011 Okamoto .......... G02F 1/133555
                                                           349/141
2012/0313906 A1* 12/2012 Tamaki et al. .............. 345/204

FOREIGN PATENT DOCUMENTS

| JP | 2004-264578 | 9/2004 |
| JP | 2005-257836 | 9/2005 |
| JP | 2006-201799 | 8/2006 |
| JP | 2008-287109 | 11/2008 |
| JP | 2009-093115 | 4/2009 |
| KR | 1020060053563 | 5/2006 |
| KR | 1020060088616 | 8/2006 |
| KR | 1020070041106 | 4/2007 |
| TW | 200301838 | 7/2003 |

OTHER PUBLICATIONS

Korean Office Action issued Sep. 30, 2014 in corresponding Korean Application No. 10-2013-129393.
Taiwan Office Action issued Jun. 16, 2015 in corresponding Taiwan Application No. 102138956.

* cited by examiner

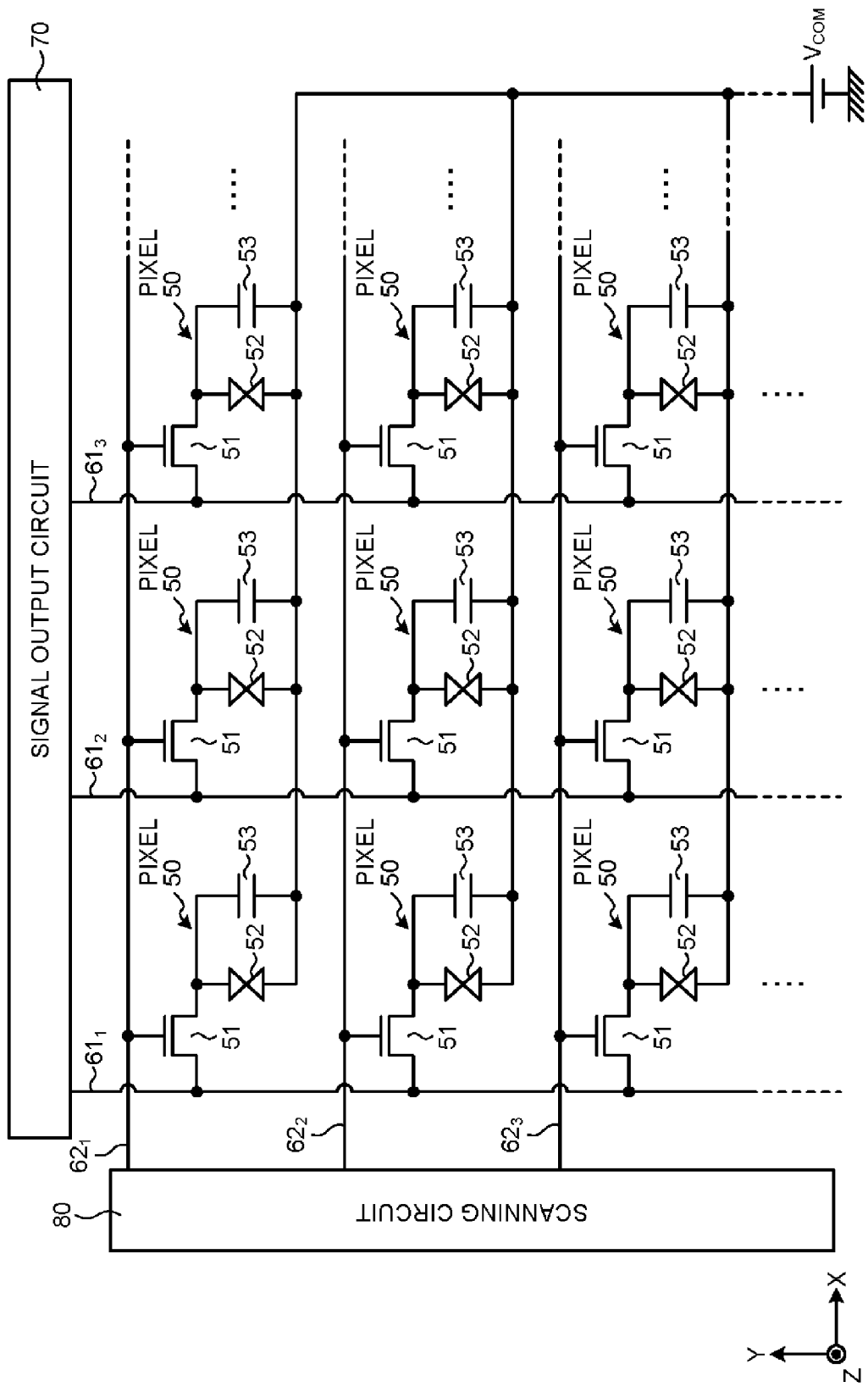

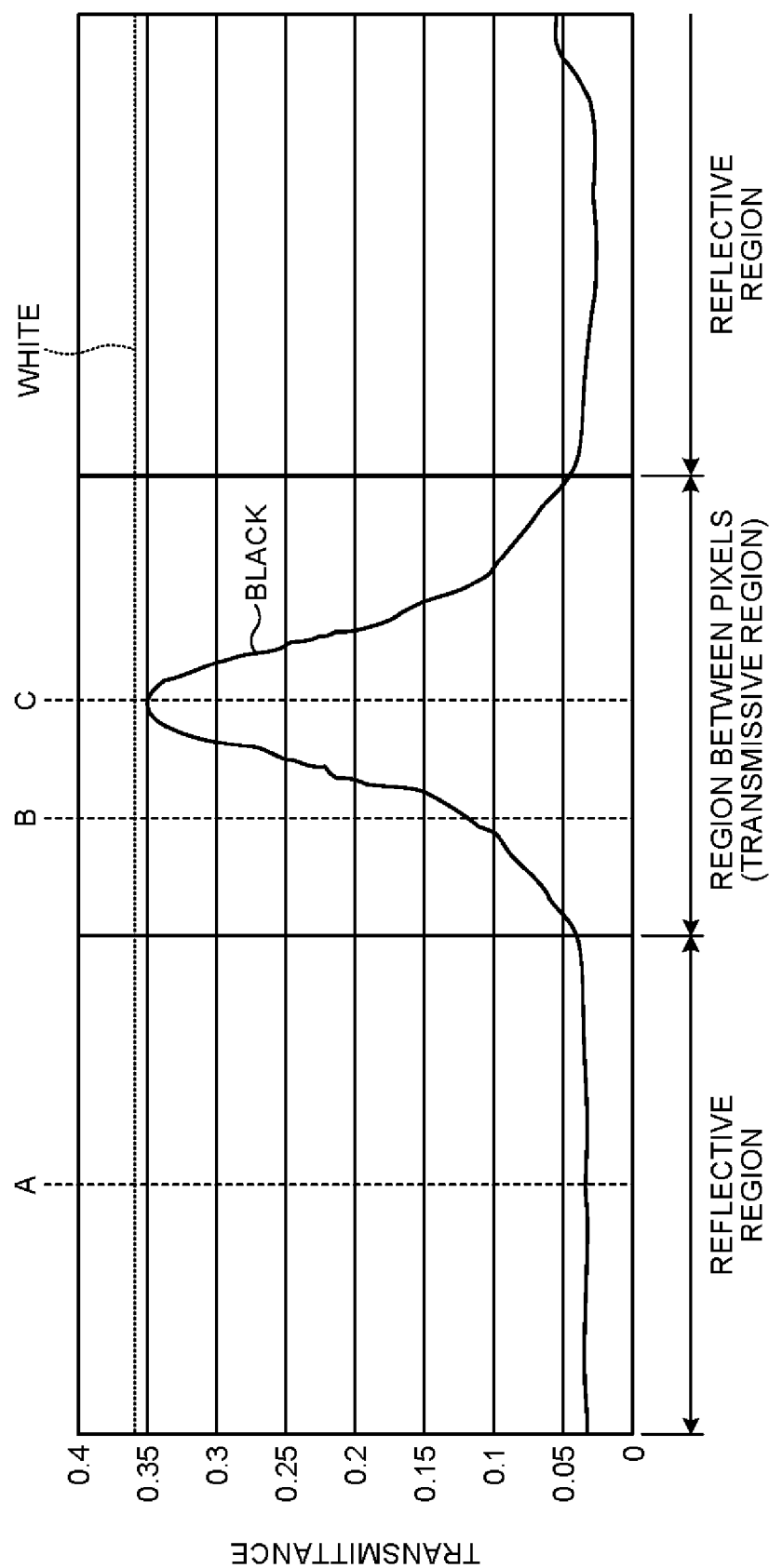

LIGHT EMITTING PORTION
111

SHUTTER BUTTON
114

DISPLAY UNIT
112

SHUTTER BUTTON
114

113
MENU SWITCH

141 UPPER CASING
144 DISPLAY
142 LOWER CASING

141 UPPER CASING
142 LOWER CASING

UPPER CASING
141

142
LOWER CASING

TRANSFLECTIVE DISPLAY DEVICE, ELECTRONIC APPARATUS, AND METHOD OF DRIVING TRANSFLECTIVE DISPLAY DEVICE

CROSS REFERENCES TO RELATED APPLICATIONS

The present application claims priority to Japanese Priority Patent Application JP 2012-243692 filed in the Japan Patent Office on Nov. 5, 2012, the entire content of which is hereby incorporated by reference.

BACKGROUND

1. Technical Field

The present disclosure relates to a transflective display device, an electronic apparatus provided with the same, and a method of driving a transflective display device.

2. Description of the Related Art

Examples of a display device include a transmissive display device that performs display using transmitted light of backlight light on a rear surface side of a screen, and a reflective display device that performs display using reflected light of external light. The transmissive display device has characteristics that saturation is high, and a screen is easy to view under a dark environment. The reflective display device has characteristics that power consumption is low, and the screen is easy to view under a bright environment.

In addition, examples of a display device which has characteristics of both the transmissive display device and the reflective display device include a transflective display device having a transmissive display region (transmissive display portion) and a reflective display region (reflective display portion) in one pixel (for example, refer to Japanese Patent Application Laid open Publication No. 2009-93115). The transflective display device performs display using transmitted light of backlight light under a dark environment, and performs display using reflective light of external light under a bright environment.

The transflective display device provides a screen that is easy to view under both a bright environment and a dark environment, and has low power consumption. Accordingly, the transflective display device has been used as a display unit of electronic apparatuses, particularly, mobile type electronic apparatuses (portable electronic apparatuses) that are frequently used in outdoor environments, for example, portable information apparatuses such as digital cameras, or portable communication apparatuses such as cellular phones.

In the transflective display device, securement of a transmissive display region and retention of reflective display performance have a trade-off relationship. That is, in a case of largely securing the transmissive display region to increase transmissive display performance, since it cannot help reducing the reflective display region by the increase, reflective display performance decreases. On the contrary, in a case of maintaining the same reflective display performance as in the reflective display device, since it is necessary to largely secure the reflective display region, the transmissive display performance decreases by that degree.

For the foregoing reasons, there is a need for a transflective display device that is capable of performing transmissive display while maintaining the same reflective display performance as the reflective display device, an electronic apparatus provided with the same, and a method of driving the transflective display device.

SUMMARY

According to an aspect, a transflective display device, includes a first substrate on which a first orientation film and a plurality of reflective electrodes formed for each of pixels are provided; a second substrate on which a second orientation film and a transparent electrode that is opposite to the reflective electrodes are provided; and a liquid crystal layer including a plurality of liquid crystal molecules provided between the first substrate and the second substrate. A direction of long axis of the liquid crystal molecules is parallel to surfaces of the first and second orientation films and twisted between the first substrate and the second substrate. The reflective electrode is configured to perform reflective display, and a space between the reflective electrodes of the adjacent pixels is configured to perform transmissive display.

According to another aspect, an electronic apparatus has a transflective display device. The transflective display device includes a first substrate on which a first orientation film and a plurality of reflective electrodes formed for each of pixels are provided; a second substrate on which a second orientation film and a transparent electrode that is opposite to the reflective electrodes are provided; and a liquid crystal layer including a plurality of liquid crystal molecules provided between the first substrate and the second substrate. A direction of long axis of the liquid crystal molecules is parallel to surfaces of the first and second orientation films and twisted between the first substrate and the second substrate. The reflective electrode is configured to perform reflective display, and a space between the reflective electrodes of the adjacent pixels is configured to perform transmissive display.

According to another aspect, a method is for driving a transflective display device including a first substrate on which a first orientation film and a plurality of reflective electrodes formed for each of pixels are provided, a second substrate on which a second orientation film and a transparent electrode that is opposite to the reflective electrodes are provided, and a liquid crystal layer including a plurality of liquid crystal molecules provided between the first substrate and the second substrate. The method includes: performing reflective display using the reflective electrodes; and performing transmissive display using a space between the reflective electrodes of the adjacent pixels. A direction of long axis of the liquid crystal molecules is parallel to surfaces of the first and second orientation films and twisted between the first substrate and the second substrate.

Additional features and advantages are described herein, and will be apparent from the following Detailed Description and the figures.

BRIEF DESCRIPTION OF THE FIGURES

FIG. 2A is a circuit diagram illustrating a basic pixel circuit;

FIG. 9 is a diagram illustrating a simulation result of transmittance between pixels in a case of a normally white mode;

DETAILED DESCRIPTION

Figure 1:
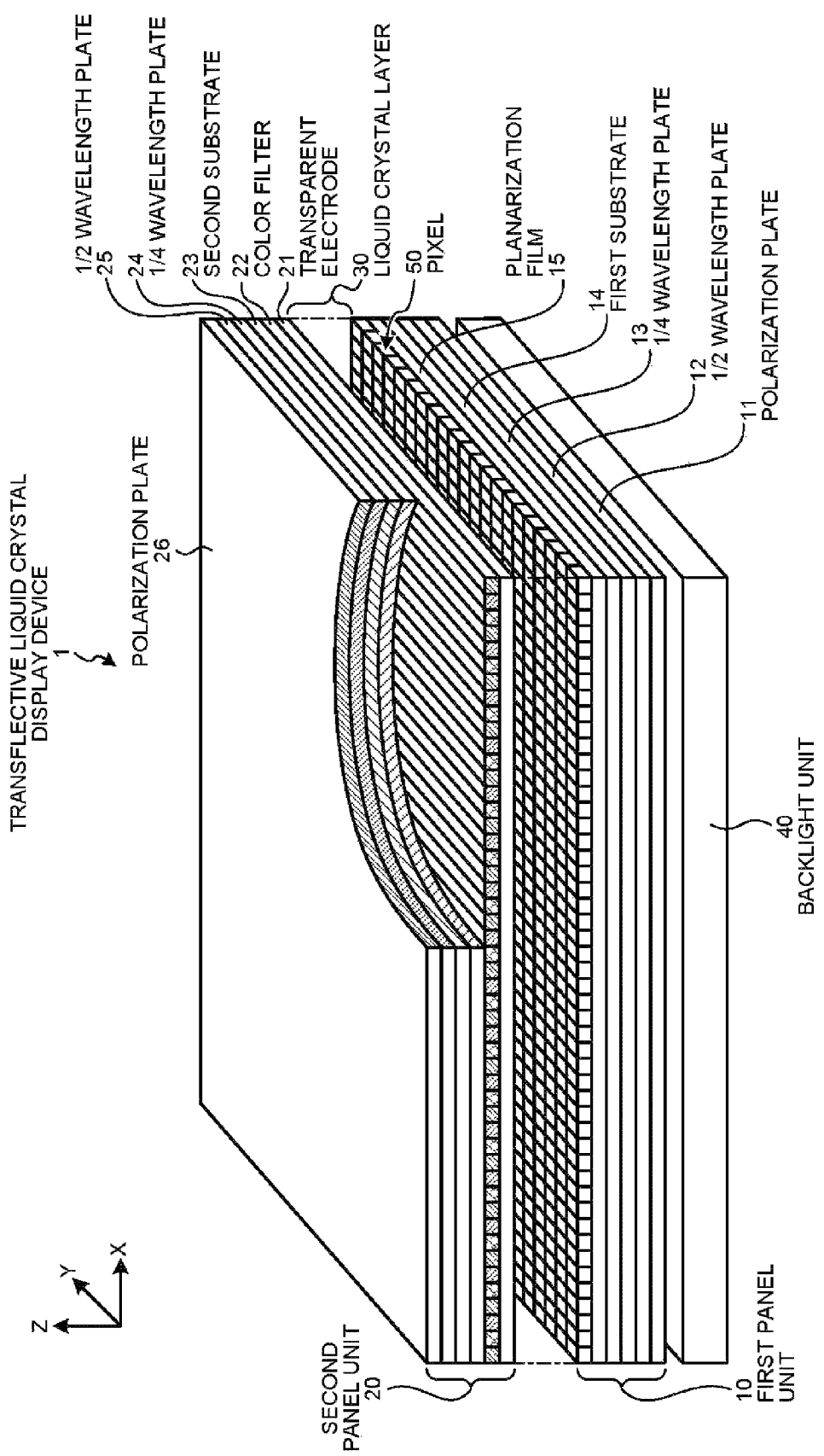
FIG. 1 is a perspective view schematically illustrating a configuration of a transflective display device, to which the present disclosure is applied, in a state in which a part thereof is notched.

Hereinafter, an example of implementing a technology of the present disclosure (hereinafter, simply referred to as an "embodiment") will be described in detail in the following order with reference to the attached drawings.

1. Transflective Display Device to Which Present Disclosure is Applied
   1-1. Transflective Display Device Capable of Color Display
   1-2. Basic Pixel Circuit
   1-3. Pixel and Sub-pixel
   1-4. Examination on Electrode Structure of Pixel Portion
2. Description of Embodiment
   2-1. Driving method of Liquid Crystal Display Panel
   2-2. MIP Technology
   2-3. Display Mode
   2-4. Black Matrix and Overlapping of Color Filter
   2-5. Orientation of Liquid Crystal Molecule
   2-6. Scattering Layer
   2-7. Specific Example
3. Modification
4. Electronic Apparatus
5. Aspects of Present Disclosure 1. Transflective Display Device to which Present Disclosure is Applied The technology of the present disclosure is applicable to a flat panel type (plane type) display device. Examples of the flat panel type display device include a display device using a liquid crystal display (LCD) panel, a display device using an electro luminescence (EL) display panel, a display device using a plasma display (PD) panel, and the like.

When being classified according to a display type, these flat panel type display devices may be classified into a transmissive type, a reflective type, and a transflective type. The technology of the present disclosure is applicable to a transflective display device having characteristics of both a transmissive display device and a reflective display device, that is, a transflective display device that provides a screen easy to view both in a bright environment and in a dark environment, and has low power consumption. The transflective display device having these characteristics is very appropriate as a display unit of electronic apparatuses, particularly, portable electronic apparatuses which is frequently used in outdoor environments, that is, portable electronic apparatuses, for example, portable information apparatuses such as digital cameras, or portable communication apparatuses such as cellular phones.

The transflective display device to which the present disclosure is applied may be a display device for monochrome display, or a display device capable of color display. In a case capable of color display, one pixel (unit pixel) that is a unit for forming a color image includes a plurality of sub-pixels. More specifically, in the display device capable of color display, the unit pixel includes, for example, three sub-pixels: a sub-pixel that displays a red color (R), a sub-pixel that displays a green color (G), and a sub-pixel that displays a blue color (B).

However, a pixel is limited to a combination of sub-pixels of three primary colors of RGB. For example, a sub-pixel of one color or sub-pixels of a plurality of colors may be added to the sub-pixels of three primary colors of RGB to constitute a unit pixel. More specifically, for example, the unit pixel may be constituted by adding a sub-pixel that displays a white color (W) to improve brightness, or the unit pixel may be constituted by adding at least one sub-pixel that displays a complementary color to enlarge a color reproducing range.

1-1. Transflective Display Device Capable of Color Display

Hereinafter, description will be made by exemplifying a transflective display device capable of color display as the transflective display device to which the present disclosure is applied while referring to the attached drawings.

As illustrated in FIG. 1, the transflective display device 1 to which the present disclosure is applied includes a first panel unit 10, a second panel unit 20, a liquid crystal layer 30, and a backlight unit 40 as main constituent elements. In the transflective display device 1, a surface side of the second panel unit 20 is a display surface side. The first panel unit 10 and the second panel unit 20 are disposed to be opposite to each other with a predetermined gap. A liquid crystal material is sealed in the gap between the first panel unit 10 and the second panel unit 20 to form a liquid crystal layer 30.

In the first panel unit 10, a polarization plate 11, a ½ wavelength plate 12, a ¼ wavelength plate 13, a first substrate 14 formed using transparent glass or the like as a substrate material, and a planarization film 15 are provided in order from a side opposite to the liquid crystal layer 30, that is, from the backlight unit 40 side.

In the first panel unit 10, a plurality of signal lines (not illustrated) and a plurality of scanning lines (not illustrated) are formed to intersect each other on the first substrate 14. At portions at which the plurality of signal lines and the plurality of scanning lines intersect each other, sub-pixels (hereinafter, may be simply described as "pixels") 50 are two-dimensionally disposed in a matrix manner.

Furthermore, switching elements such as a TFT (Thin Film Transistor), and circuit elements such as a capacitative element are formed on the first substrate 14 for each of the pixels 50. The planarization film 15 is formed on the surface of the circuit elements, signal lines, and scanning lines so that the surface of the first panel unit 10 is made planar. In addition, a reflective electrode to be described later is formed on the planarization film 15 for each of the pixels 50. Circuit elements including a TFT are formed in the first substrate 14, and thus the first substrate 14 is also referred to as a TFT substrate in some cases.

The plurality of signal lines are wirings through which signals (display signals/video signals) for driving the pixels 50 are transmitted, and have a wiring structure that extends along an arrangement direction of pixels belonging to a pixel column, that is, a column direction (Y direction in FIG. 1) for each pixel column with respect to matrix arrangement of the pixels 50. The plurality of scanning lines are wirings through which signals (scanning signals) for selecting the pixels 50 row by row are transmitted, and have a wiring structure that extends along an arrangement direction of pixels belonging to a pixel row, that is, a row direction (X direction in FIG. 1) for each pixel row with respect to matrix arrangement of the pixels 50. The X direction and the Y direction are perpendicular to each other.

The second panel unit 20 has a configuration in which a transparent electrode 21 formed from ITO (Indium Tin Oxide) or the like, a color filter 22, a second substrate 23 formed using transparent glass or the like as a substrate material, a ¼ wavelength plate 24, a ½ wavelength plate 25, and a polarization plate 26 are provided in order from the liquid crystal layer 30 side.

In the second panel unit 20, for example, the color filter 22 has a configuration in which respective strip-shaped filters of R (red color), G (green color), and B (blue color), which extend in the column direction (Y direction), are repetitively arranged at the same pitch as that of the pixels 50 in the row direction (X direction). The color filter (CF) 22 is arranged on the second substrate 23, and thus the second substrate 23 is also referred to as a CF substrate in some cases.

The transflective display panel is constituted by the first panel unit 10, the second panel unit 20 disposed to be opposite to the first panel unit 10, and the liquid crystal layer 30 disposed between the first panel unit 10 and the second panel unit 20, and the top surface (front surface) of the second panel unit 20 is a display surface.

The backlight unit 40 is an illumination unit which illuminates the liquid crystal display panel from a rear surface side of the liquid crystal display panel, that is, from a side of the first panel unit 10 which is opposite to the liquid crystal layer 30. The structure and constituent elements of the backlight unit 40 are not particularly limited, but for example, light sources such as an LED (Light Emitting Diode) and a fluorescent tube, and known members such as a prism sheet, a diffusion sheet, and a light guiding plate may be used.

In the transflective display device 1 having the above-described configuration, the pixels 50 include a reflective display region (reflective display portion) and a transmissive display region (transmissive display portion) for each of the pixels 50. As described above, the reflective display region includes a reflective electrode on a surface of the planarization film 15 for each of the pixels 50. External light, which is incident from the outside through the second panel unit 20, is reflected by the reflective electrode, and display is performed by the reflected light. The transmissive display region allows light from the backlight unit 40 to transmit therethrough, and performs display by the transmitted light. Details of the transmissive display region provided for each of the pixels 50 will be described later.

1-2. Basic Pixel Circuit

A basic pixel circuit of the pixels 50 will be described with reference to FIG. 2A. A direction (X direction) indicated by X in FIG. 2A represents a row direction of the transflective display device 1 illustrated in FIG. 1, and a direction (Y direction) indicated by Y represents a column direction.

As illustrated in FIG. 2A, a plurality of signal lines 61 ($61_1$, $61_2$, $61_3$, ... ) and a plurality of scanning lines 62 ($62_1$, $62_2$, $62_3$, ... ) are wired to intersect each other, and the pixels 50 are disposed at intersections thereof. An extending direction of the plurality of scanning lines 62 ($62_1$, $62_2$, $62_3$, ... ) is the row direction (X direction), and an extending direction of the plurality of signal lines 61 ($61_1$, $61_2$, $61_3$, ... ) is the column direction (Y direction). As described above, the plurality of signal lines 61 and the plurality of scanning lines 62 are formed on a surface of the first substrate (TFT substrate) 14 of the first panel unit 10. One ends of the signal lines 61 ($61_1$, $61_2$, $61_3$, ... ) are connected to output terminals of a signal output circuit 70 respectively, each of which corresponds to a column, and one ends of the plurality of scanning lines 62 ($62_1$, $62_2$, $62_3$, ... ) are connected to output terminals of a scanning circuit 80 respectively, each of which corresponds to a row.

For example, each of the pixels 50 includes a pixel transistor 51 using a thin film transistor (TFT), a liquid crystal capacitor 52, and a holding capacitor 53. In the pixel transistor 51, a gate electrode thereof is connected to the scanning line 62 ($62_1$, $62_2$, $62_3$, ... ), and a source electrode thereof is connected to the signal line 61 ($61_1$, $61_2$, $61_3$, ... ).

The liquid crystal capacitor 52 represents a capacitance component of a liquid crystal material which is generated between a pixel electrode and a counter electrode (corresponding to the transparent electrode 21 in FIG. 1) formed to be opposite to the pixel electrode, and the pixel electrode is connected to a drain electrode of the pixel transistor 51. The pixel electrode corresponds to a reflective electrode that is formed for each sub-pixel in a case of color display, and corresponds to a reflective electrode that is formed for each pixel in a case of monochrome display. A common potential $V_{COM}$ of a direct voltage is applied to the counter electrode of the liquid crystal capacitor 52 in a common manner for the entire pixels. In the holding capacitor 53, one electrode is connected to the pixel electrode of the liquid crystal capacitor 52, and the other electrode is connected to the counter electrode of the liquid crystal capacitor 52, respectively.

As is clear from the above-described pixel circuit, the plurality of signal lines 61 ($61_1$, $61_2$, $61_3$, ... ) are wirings through which signals for driving the pixels 50, that is, video signals output from the signal output circuit 70 are transmitted to the pixels 50 for each pixel column. The plurality of scanning lines 62 ($62_1$, $62_2$, $62_3$, ... ) are wirings through which signals for selecting the pixels 50 row by row, that is, scanning signals output from the scanning circuit 80 are transmitted for each pixel row.

1-3. Pixel and Sub-Pixel

Figure 2B:
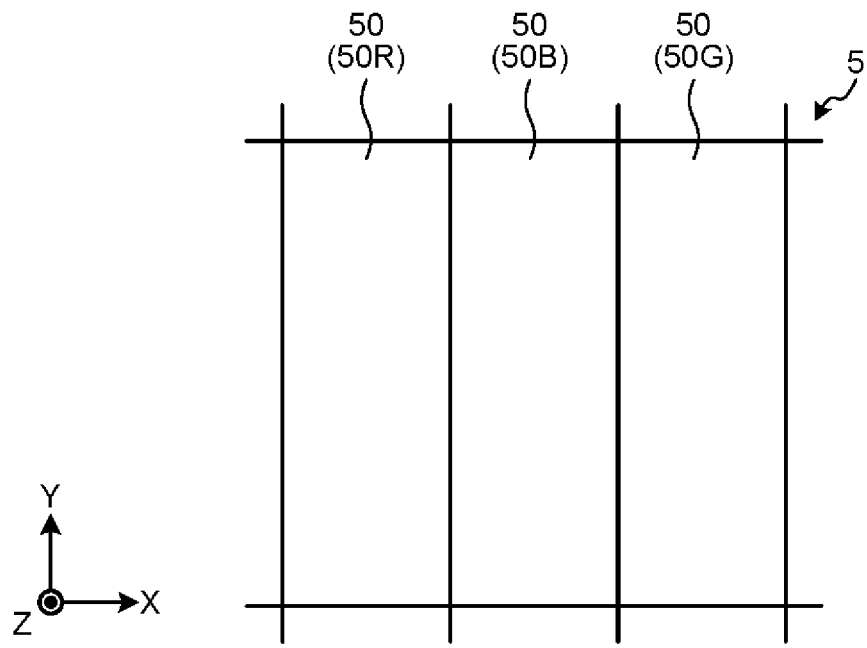
FIG. 2B is a schematic diagram of a pixel in color display.
Figure 2C:
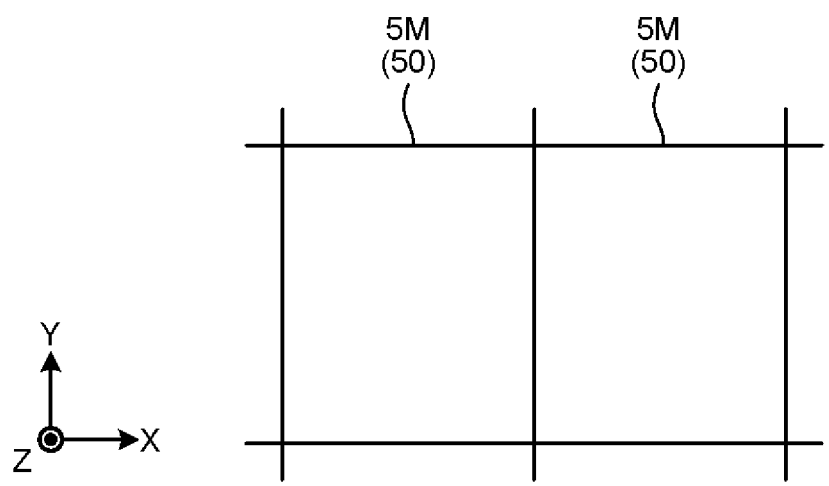
FIG. 2C is a schematic diagram of a pixel in monochrome display.

In the case in which the transflective display device 1 is capable of color display, as illustrated in FIG. 2B, one pixel that is a unit for forming a color image, that is, a unit pixel 5 includes, for example, a plurality of sub-pixels 50. In this example, the unit pixel 5 includes a sub-pixel 50R that displays a red color, a sub-pixel 50B that displays a blue color, and a sub-pixel 50G that displays a blue color. The sub-pixels 50R, 50B, and 50G of the unit pixel 5 are arranged in the X direction, that is, the row direction of the transflective display device 1. As described above, the unit pixel 5 may further include a sub-pixel of one color or sub-pixels of a plurality of colors. In the case in which the transflective display device 1 is only capable of the monochrome display, as illustrated in FIG. 2C, one pixel that is a unit for forming a monochrome image, that is, a unit pixel 5M is the pixel 50 (corresponds to the sub-pixel 50 in the color image). The unit pixel 5 is a basic unit for displaying a color image, and the unit pixel 5M is a basic unit for displaying a monochrome image.

1-4. Examination on Electrode Structure of Pixel Portion

Before describing the transmissive display region, an electrode structure of the pixel 50 will be examined.

Figure 3A:
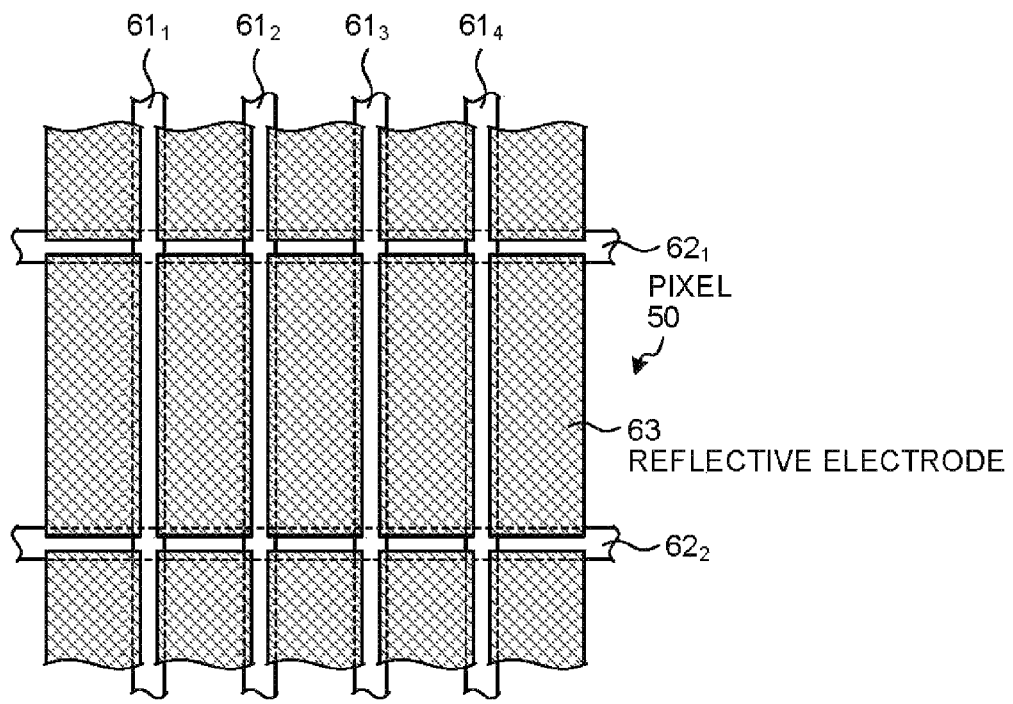
FIG. 3A is a plan view of a pixel portion of a reflective display device.
Figure 3B:
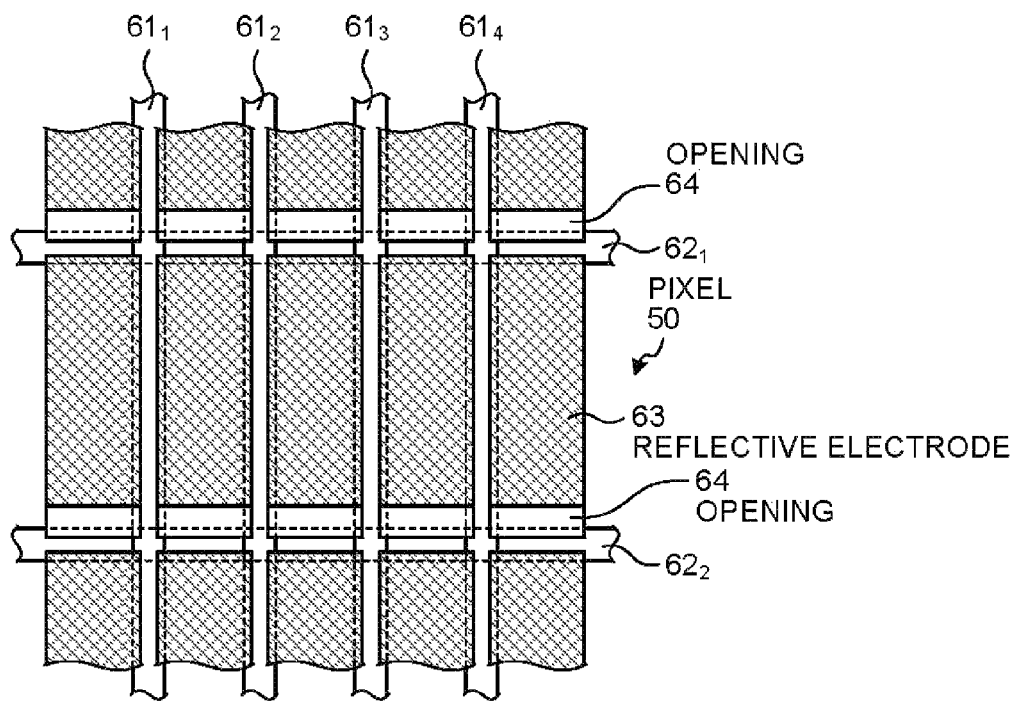
FIG. 3B is a plan view of a pixel portion of a transflective display device.

FIGS. 3A and 3B are diagrams provided for description of an electrode structure of a pixel portion in the related art. FIG. 3A illustrates a plan view of a pixel portion of a reflective (total reflection type) display device, and FIG. 3B illustrates a plan view of a pixel portion of a transflective display device in the related art, respectively. In FIGS. 3A and 3B, reflective electrodes 63 are illustrated by hatching.

As illustrated in FIGS. 3A and 3B, generally, the pixel portion of the liquid crystal display device is configured as follows. The pixels 50 are arranged in matrix. With regard to the matrix arrangement, each of the signal lines 61 is wired at a position of spaces between pixels 50 extending along a column direction, and each of the scanning lines 62 is wired at a position of spaces between pixels 50 extending along the row direction. As described above, the signal lines 61 and the scanning lines 62 are wired on the first substrate 14 of the first panel unit 10 illustrated in FIG. 1 to intersect each other.

With regard to the pixel portion (pixel array portion) of this configuration, in the reflective display device illustrated in FIG. 3A, each of the reflective electrodes 63 formed from a metal such as aluminum is formed with substantially the same size as the pixel 50, and the region of the reflective electrode 63 is set as a reflective display region. That is, in the reflective display device, desired reflective display performance is obtained by securing the reflective display region having substantially the same size as the pixel 50.

On the contrary, in the transflective display device of the related art which is illustrated in FIG. 3B, an opening 64 is formed together with the reflective electrode 63 within one pixel 50, and the opening 64 is used as a transmissive display region. In this manner, when the opening 64 is formed within the pixel 50 to secure the transmissive display region, it cannot help reducing the reflective electrode 63, that is, the reflective display region by the area of the opening 64. In the transflective display device in the related art, the reflective display performance decreases compared to that of the reflective display device. That is, securement of the transmissive display region and the retention of the reflective display performance have a trade-off relationship.

2. Description of Embodiment

The transflective display device 1 according to the embodiment of the present disclosure performs transmissive display using a space between the reflective electrodes 63 of the adjacent pixels 50 to perform transmissive display while maintaining the same reflective display performance as the reflective display device. Specifically, as illustrated in FIG. 4, in the pixel portion in which the pixels 50 are arranged in matrix, wirings such as the signal lines 61 and the scanning lines 62 are formed not to block a space between the reflective electrodes 63 of the adjacent pixels 50, and thus the space is used as the transmissive display region to perform the transmissive display.

Figure 4:
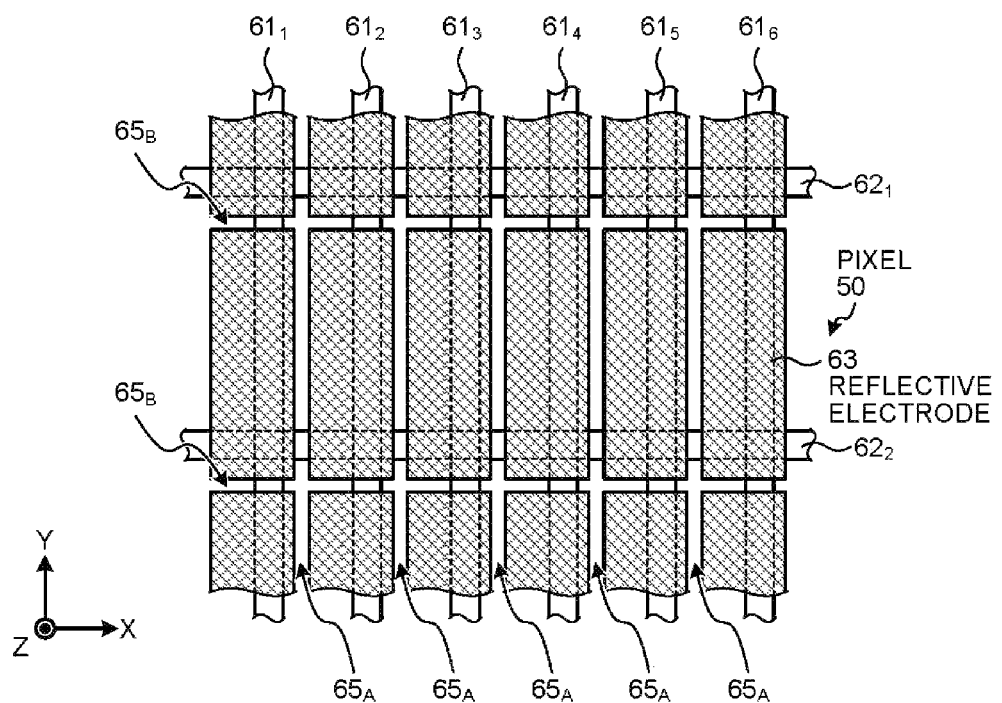
FIG. 4 is a plan view illustrating an electrode structure of a pixel portion according to the embodiment.

In FIG. 4, the reflective electrode 63 is indicated by hatching. The space between the reflective electrodes 63 of the adjacent pixels 50 includes a space $65_A$ that extends along the arrangement direction of the pixels of the pixel column, that is, a column direction (Y direction illustrated in FIG. 4), and a space $65_B$ that extends along the arrangement direction of the pixels of the pixel row, that is, a row direction (X direction illustrated in FIG. 4). In this example, as wirings formed in the pixel portion, the signal lines 61 and the scanning lines 62 are exemplified, but the wirings formed in the pixel portions are not limited thereto. That is, any of drive lines (control lines) necessary to drive (control) the pixels 50 are included in the wirings formed in the pixel portion.

"Not blocking a space" does not exclude presence of a region in which the wirings overlap the spaces $65_A$ and $65_B$ between the reflective electrodes 63 of the adjacent pixels 50. Specifically, a state in which the signal line 61 wired in the column direction overlaps the space $65_B$ extending a row direction, and a state in which the scanning line 62 wired in the row direction overlaps the space $65_A$ extending in a column direction are intended to be included in the concept of "not blocking a space".

In addition, a state in which the signal line 61 partially overlaps the space $65_A$ extending in the column direction or a state in which the scanning line 62 partially overlaps the space $65_B$ extending in the row direction is also intended to be included in the concept of "not blocking a space". In all cases, the region of the spaces $65_A$ and $65_B$ which is not overlapped by the signal line 61 and the scanning line 62 is used as the transmissive display region.

In addition, to form the wirings so as not to block the spaces $65_A$ and $65_B$ between the reflective electrodes 63 of the adjacent pixels 50, it is preferable to form the wirings to avoid the spaces $65_A$ and $65_B$ between the reflective electrodes 63 of the adjacent pixels 50. "To avoid the spaces" represents a state in which the wiring is not present within the spaces $65_A$ or $65_B$ between the reflective electrodes 63 of the adjacent pixels 50 (that is, a region of the space $65_A$ which is overlapped by the wiring and a region of the space $65_B$ which is overlapped by the same wiring do not coexist).

Specifically, as illustrated in FIG. 4, it is preferable that the signal line 61 be wired to avoid the space $65_A$ extending in the column direction, that is, without a region (portion) overlapping the space $65_A$. It is preferable that the scanning line 62 be wired to avoid the space $65_B$ extending in the row direction, that is, without a region overlapping the space $65_B$. When the signal lines 61 and the scanning lines 62 are formed to avoid the spaces $65_A$ and $65_B$ between the reflective electrodes 63 of the adjacent pixels 50, since substantially the entire region of the spaces $65_A$ and $65_B$ can be used as the transmissive display region, the transflective display device 1 may obtain relatively high transmissive display performance.

As described above, the transflective display device 1 performs transmissive display using the space between the reflective electrodes 63 of the adjacent pixels 50. That is, the region of the space is set as the transmissive display region, and thus it is not necessary to separately secure the transmissive display region within the pixel 50. According to this configuration, as is clear from comparison between FIG. 3A and FIG. 4, the transflective display device 1 can secure the reflective electrode 63 having the same dimensions as that of the reflective display device if the pixels 50 have the same size. As a result, the transflective display device 1 can perform the transmissive display while maintaining the same reflective display performance as the reflective display device.

2-1. Driving Method of Liquid Crystal Display Panel

In the liquid crystal display panel (liquid crystal display device), a driving method in which the polarity of a video signal is inverted at a predetermined period with a common potential $V_{COM}$ made as a reference is employed so as to suppress deterioration of specific resistance (intrinsic resistance value of a material) of liquid crystal due to continuous application of a direct voltage with the same polarity to a liquid crystal.

As a driving method of the liquid crystal display panel, driving methods such as the line inversion driving method, the dot inversion driving method, and the frame inversion driving method are known. The line inversion driving method is a driving method in which the polarity of a video signal is inverted at a time period of 1 H (H represents a horizontal period) which corresponds to one line (one pixel row). The dot inversion driving method is a driving method in which the polarity of a video signal is alternately inverted for each of upper, lower, left, and right pixels adjacent to each other. The frame inversion driving method is a driving method in which the polarity of video signals to be written in the total pixels is inverted at a time with the same polarity for each one frame corresponding to one screen.

In the embodiment, the transflective display device 1 may employ any one of the above-described driving methods. However, it is preferable to employ the frame inversion driving method compared to the line inversion driving method and the dot inversion driving method due to the following reason.

Figure 5A:
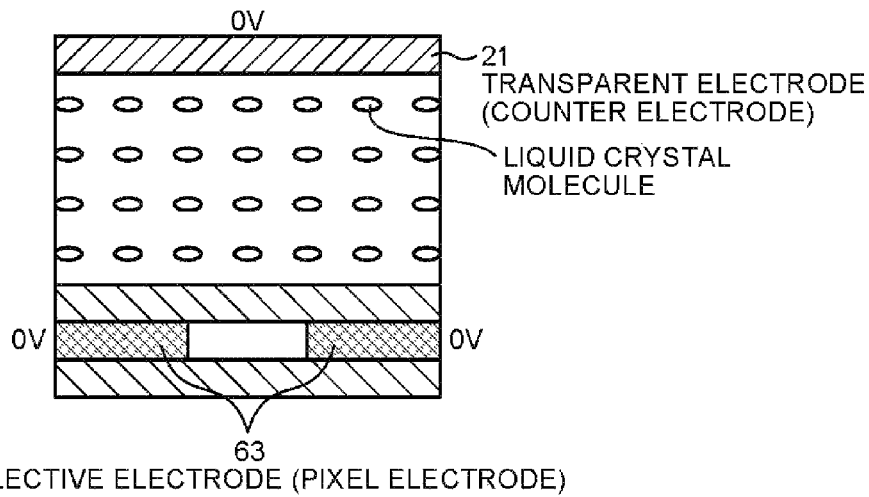
FIG. 5A is a diagram illustrating a simulation result of a case in which a voltage is not applied to the pixels.
Figure 5B:
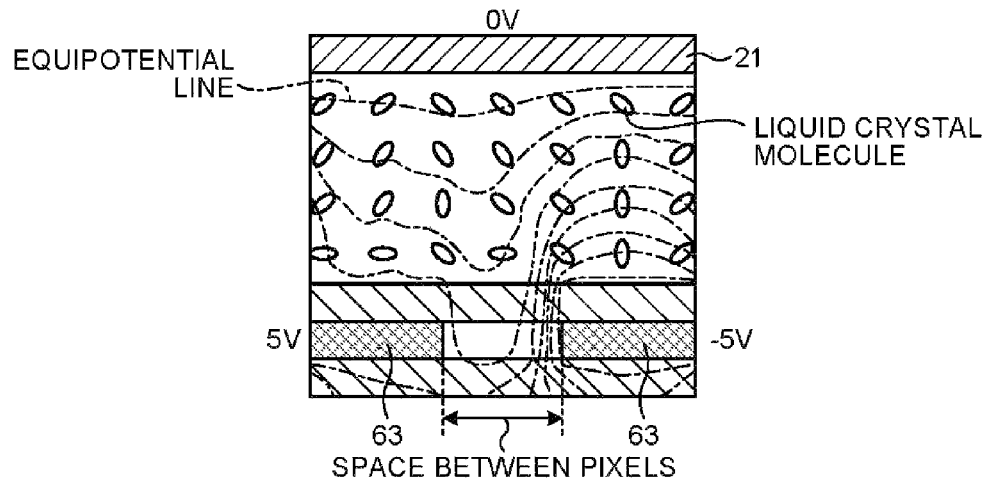
FIG. 5B is a diagram illustrating a simulation result of a case in which a line inversion driving method or a dot inversion driving method is employed and a voltage is applied to the pixels.
Figure 5C:
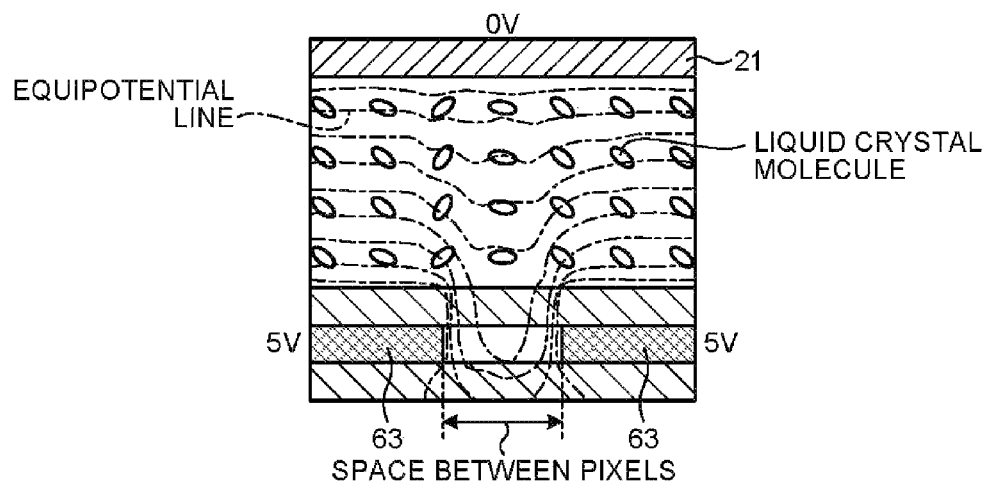
FIG. 5C is a diagram illustrating a simulation result of a case in which a frame inversion driving method is employed and a voltage is applied to the pixels.

The reason why it is preferable to employ the frame inversion driving method will be described by using a simulation result in FIGS. 5A to 5C. FIG. 5A illustrates a simulation result of a case in which a voltage is not applied to the pixels 50, FIG. 5B illustrates a simulation result of a case in which the line inversion driving method or the dot inversion driving method is employed and a voltage is applied to the pixels 50, and FIG. 5C illustrates a simulation result of a case in which the frame inversion driving method is employed and a voltage is applied to the pixels 50. In FIGS. 5B and 5C, equipotential lines are indicated by one-dot chain line.

In the case of the line inversion driving method or the dot inversion driving method, the polarity of the potential between the transparent electrode (counter electrode) 21 and the reflective electrode (pixel electrode) 63 is different between two adjacent pixels, and thus the behavior of liquid crystal molecules in the vicinity of one pixel and the behavior of the liquid crystal molecules in the vicinity of the other pixel are different from each other within a space between pixels. Therefore, liquid crystal orientation in a space between pixels is not stable. This is clear also from the distribution of equipotential lines indicated by one-dot chain line in FIG. 5B.

As described above, in the case of the line inversion driving method or the dot inversion driving method in which the polarity of the potential is different between two adjacent pixels, it is difficult to stably control the liquid crystal orientation between pixels. When the transmissive display is performed using the space between pixels, in which the liquid crystal orientation is not stable, as a transmissive display region, there is a concern that an afterimage may occur.

On the contrary, in the case of the frame inversion driving method, since the polarity of the potential between the transparent electrode 21 and the reflective electrode 63 is equal between two adjacent pixels, liquid crystal molecules behaves in the same manner in the vicinity of one pixel and in the vicinity of the other pixel within a space between pixels. Accordingly, in the case of using the frame inversion driving method, the liquid crystal orientation between pixels becomes more stable compared to the line driving method or the dot inversion driving method. This is clear also from the distribution of equipotential lines indicated by one-dot chain line in FIG. 5C.

As described above, in the case of the frame inversion driving method in which the polarity of the potential is equal between two adjacent pixels, since the liquid crystal orientation between pixels may be controlled in a relatively stable manner, when the transmissive display is performed using the space between pixels as the transmissive display region, the afterimage may be effectively suppressed. From the above-described reason, when performing the transmissive display using the space between the reflective electrodes 63 of the adjacent pixels 50, it is preferable to use the frame inversion driving method compared to the line inversion driving method or dot inversion driving method. However, as described above, it is not intended to exclude the line inversion driving method or dot inversion driving method.

2-2. MIP Technology

In the case of using the frame inversion driving method, since signal voltages with the same polarity are written to signal lines during one frame period, there is a possibility that shading may occur. Therefore, in order to use the frame inversion driving method, the transflective display device 1 employs, as the pixels 50, pixels having a memory function, for example, pixels using a so-called MIP (Memory In Pixel) technology in which memory capable of storing data is provided for each pixel. When the MIP technology is employed, a constant voltage is continuously applied to the pixels 50, and thus the shading may be reduced.

In addition, since memory that stores data is provided within a pixel, the MIP technology allows display by an analog display mode and display by a memory display mode. The analog display mode is a display mode of displaying gradation of pixels in an analog manner. The memory display mode is a display mode of displaying gradation of pixels in a digital manner based on binary information (logic "1" and logic "0") that is stored in a memory within a pixel.

In the case of the memory display mode, since information held in the memory is used, it is not necessary to perform a writing operation of a signal potential reflecting the gradation at a frame cycle. Accordingly, in the case of the memory display mode, power consumption may be lower than that of a case of the analog display mode in which it is necessary to perform the writing operation of the signal potential reflecting the gradation at a frame cycle. In other words, power consumption of the transflective display device 1 may be reduced.

Figure 6:
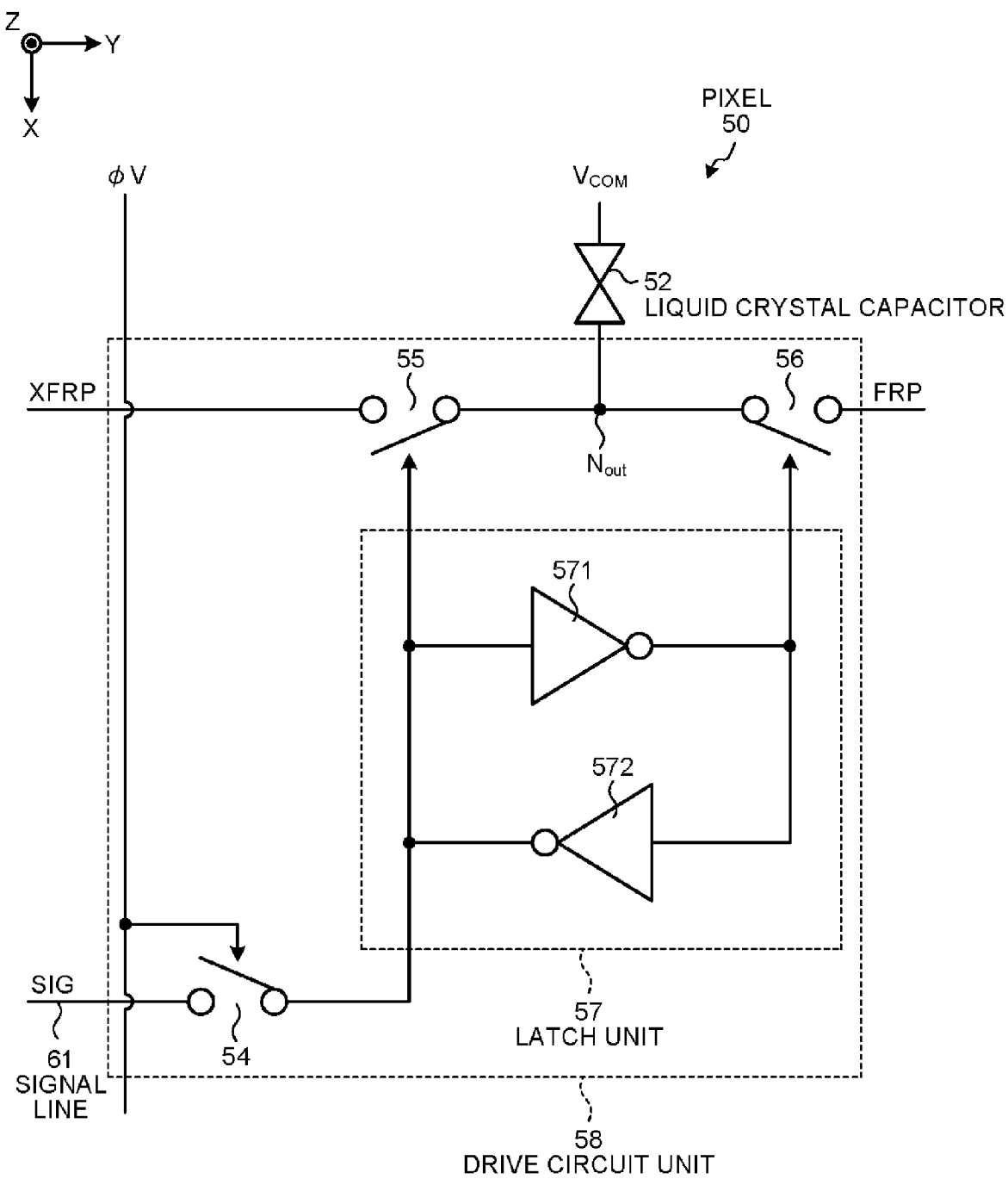
FIG. 6 is a block diagram illustrating an example of a circuit configuration of a pixel which employs an MIP technology.
Figure 7:
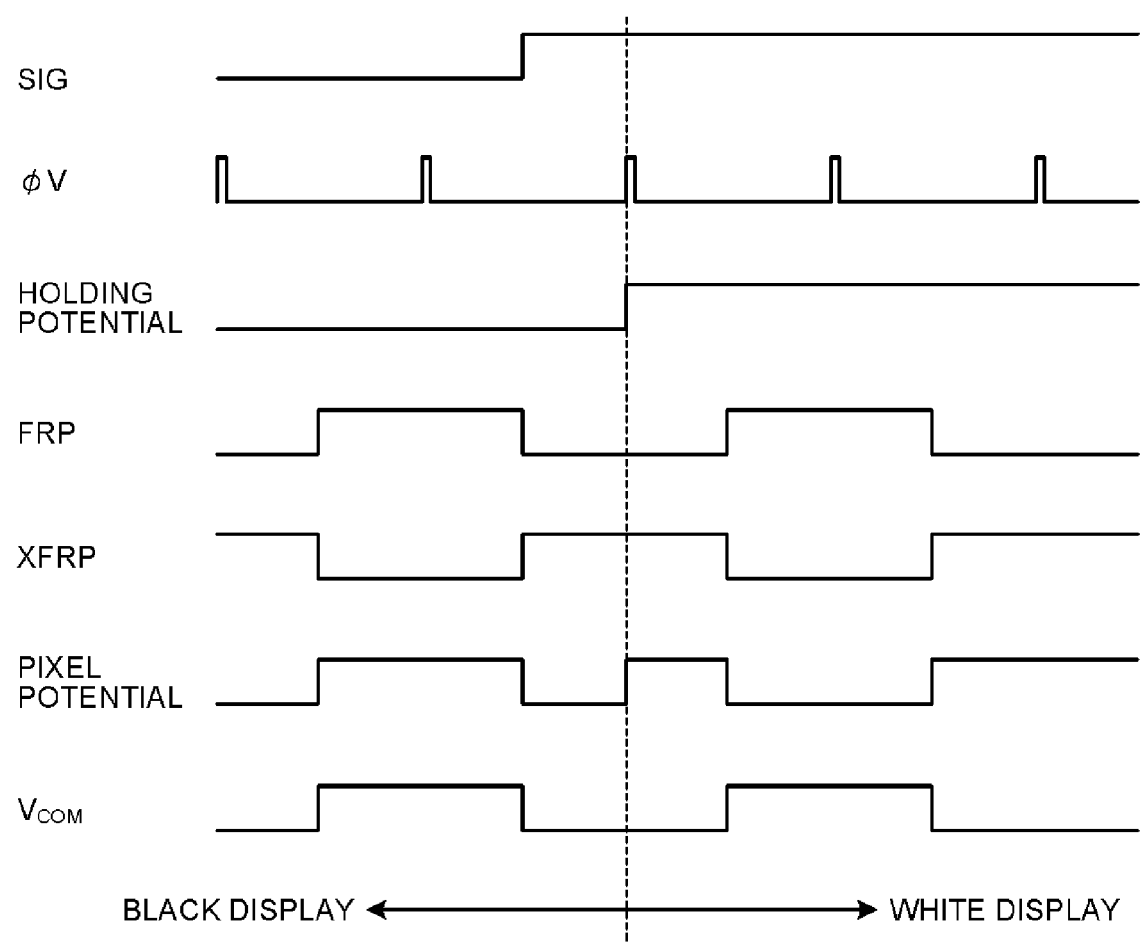
FIG. 7 is a timing chart provided for explaining an operation of the pixel which employs the MIP technology.

FIG. 6 illustrates a block diagram illustrating an example of a circuit configuration of a pixel which employs the MIP technology. In the drawing, the same reference numerals are given to the same portions as those in FIG. 2A. FIG. 7 illustrates a timing chart provided for explaining an operation of the pixel which employs the MIP technology.

As illustrated in FIG. 6, in addition to the liquid crystal capacitor (liquid crystal cell) 52, each of the pixels 50 is provided with a drive circuit unit 58 including three switch elements 54, 55, and 56, and a latch unit 57. A drive circuit unit 58 has an SRAM (Static Random Access Memory) function. The pixel 50 provided with the drive circuit unit 58 has a pixel configuration with the SRAM function. The liquid crystal capacitor (liquid crystal cell) 52 represents a liquid crystal capacitance that is generated between the pixel electrode (for example, the reflective electrode 63 in FIG. 4) and a counter electrode that is disposed to be opposite to the pixel electrode.

One end of the switch element 54 is connected to the signal line 61 (corresponding to signal lines $61_1$, $61_2$, and $61_3$ in FIG. 2A). When a scanning signal ϕV is applied from the scanning circuit 80 in FIG. 2A, the switch element 54 is set to an ON (closed) state, and takes in data SIG that is supplied from the signal output circuit 70 in FIG. 2A through the signal line 61. The latch unit 57 includes inverters 571 and 572 that are connected in parallel in directions opposite to each other, and holds (latches) a potential corresponding to the data SIG taken in by the switch element 54.

A control pulse XFRP having an opposite phase with respect to the common potential $V_{COM}$ and a control pulse FRP which is in phase with respect to the common potential $V_{COM}$ are given to one terminals of the switch elements 55 and 56, respectively. The other terminals of the switch elements 55 and 56 are commonly connected, and a common connection node is an output node $N_{out}$ of the drive circuit unit 58. Either one of the switch elements 55 and 56 is set to an ON state depending upon the polarity of the holding potential of the latch unit 57. According to this configuration, in the liquid crystal capacitor 52 whose counter electrode (the transparent electrode 21 in FIG. 1) is applied with where the common potential $V_{COM}$, the control pulse FRP or the control pulse XFRP is applied to the pixel electrode thereof (for example, the reflective electrode 63 in FIG. 4).

As is clear from FIG. 7, in the case of this example, when the holding potential of the latch unit 57 has a negative polarity, the pixel potential of the liquid crystal capacitor 52 is in phase with respect to the common potential $V_{COM}$, and thus black display is performed. When the holding potential of the latch unit 57 has a positive polarity, the pixel potential of the liquid crystal capacitor 52 has an opposite phase with respect to the common potential $V_{COM}$, and thus white display is performed.

As is clear from the above description, in the pixels 50 of the MIP, either one of the switch elements 55 and 56 is set to an ON state depending upon the polarity of the holding potential of the latch unit 57, and thus the control pulse FRP or the control pulse XFRP is applied to the pixel electrode (for example, the reflective electrode 63 in FIG. 4) of the liquid crystal capacitor 52. As a result, a constant voltage is continuously applied to the pixels 50, and thus the occurrence of shading may be suppressed.

In this example, a case in which the SRAM is used as a memory embedded in the pixels 50 has been described as an example. However, the SRAM is illustrative only, and a configuration of using other memories, for example, DRAM (Dynamic Random Access Memory) may be employed.

In the embodiment, when employing the MIP technology, an area coverage modulation method, a time division modulation method, and the like may be used. In the case of the time division modulation method, even during display of a still image, a pixel potential is different depending on time, and liquid crystal molecules within a pixel or between pixels move. Therefore, it is preferable to use the area coverage modulation method compared to the time division modulation method. In addition, in the case of the area coverage modulation method, the pixel electrode, that is, the reflective electrode 63 is divided, and thus a gap between electrodes increases. Accordingly, there is an advantage that a transmittance of a panel becomes higher than a non-division case.

In the above-described example, as the pixels having a memory function, the pixels of the MIP provided with memory capable of storing data for each pixel are used, but this is illustrative only. As the pixels having the memory function, as well as the pixels of the MIP, for example, pixels using a memory-type liquid crystal known in the related art may be exemplified.

2-3. Display Mode

Examples of the display mode of a liquid crystal includes a normally white mode in which white display is performed upon application of no electric field (voltage) and black display is performed upon application of an electric field; and a normally black mode in which black display is performed upon application of no electric field and white display is performed upon application of an electric field. Both of these modes are common in the structure of a liquid crystal cell, and different in disposition of the polarization plates 11 and 26 illustrated in FIG. 1.

In a case of performing the transmissive display using a space between the reflective electrodes 63 of the adjacent pixels 50, liquid crystal molecules between pixels are not switched entirely, and a region in which the liquid crystal molecules do not move is present. In a case of the normally white mode, it is difficult to deepen black due to the presence of the region in which the liquid crystal molecules do not move, and thus there is a concern that contrast decreases.

Figure 8:
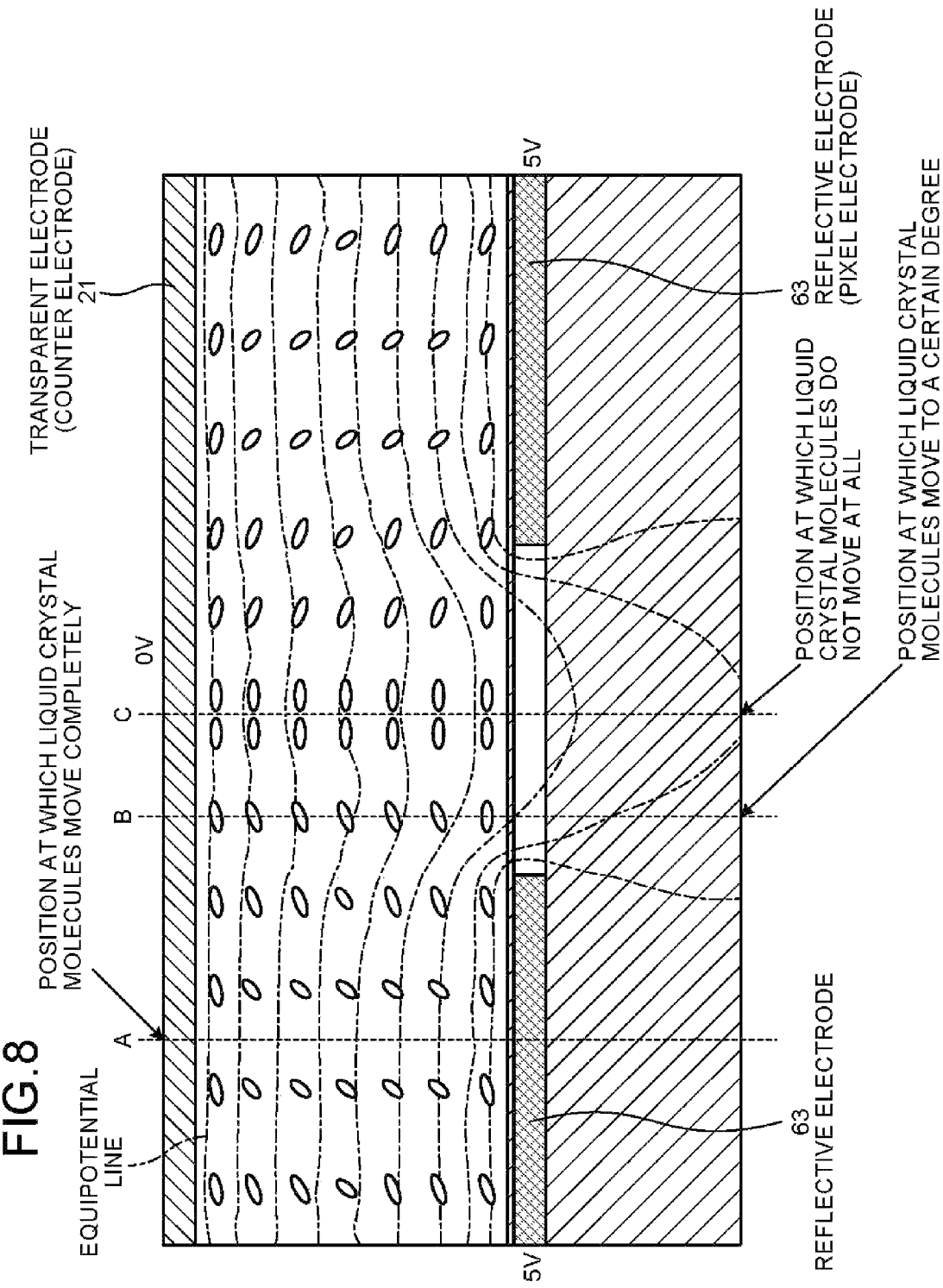
FIG. 8 is a diagram illustrating movement of liquid crystal molecules between pixels in a case of performing transmissive display using a space between reflective electrodes of adjacent pixels.

FIG. 8 illustrates movement of liquid crystal molecules between pixels in a case of performing transmissive display using a space between the reflective electrodes 63 of the adjacent pixels 50. In FIG. 8, at a position A of the central portion of the reflective electrode 63, liquid crystal molecules move completely. Contrary to this, at a position B which is located between pixels and in the vicinity of the reflective electrode 63, the liquid crystal molecules move to a certain degree, and at a position C of the central portion between pixels, the liquid crystal molecules do not move at all.

In this manner, in the region of the central portion between pixels at which the liquid crystal molecules do not move at all, a transmittance increases extremely compared to the region of the reflective electrode 63, and thus light leakage occurs. Therefore, black is not deepened, and thus contrast decreases.

FIG. 9 illustrates a simulation result of the transmittance between pixels in a case of the normally white mode. In FIG. 9, positions A, B, and C correspond to the position A, B, and C in FIG. 8, respectively. From the simulation result in FIG. 9, it can be understood that at the position C of the central position between pixels in FIG. 8, the liquid crystal molecules do not move at all, and thus a transmittance is high (for example, approximately 0.35).

Accordingly, it is preferable to employ a normally black mode as a display mode of the transflective display device according to the embodiment. In a case of the normally black mode, in a state in which a voltage is not applied to liquid crystal, that is, a state in which liquid crystal orientation is uniform, black display is performed, and thus black may be deepened and contrast may be increased. However, it is not intended to exclude employment of the normally white mode.

As an example of a measurement result of optical characteristics, in a case of the normally white mode, a white transmittance (%) is approximately 0.93 and a black transmittance (%) is approximately 0.29, and thus contrast is approximately 3. In a case of the normally black mode, a white transmittance (%) is approximately 0.71, and a black transmittance (%) is approximately 0.06, and thus contrast is approximately 12. That is, when employing the normally black mode, the contrast may be improved approximately four times the case of the normally white mode.

2-4. Black Matrix and Overlapping of Color Filter

Figure 10A:
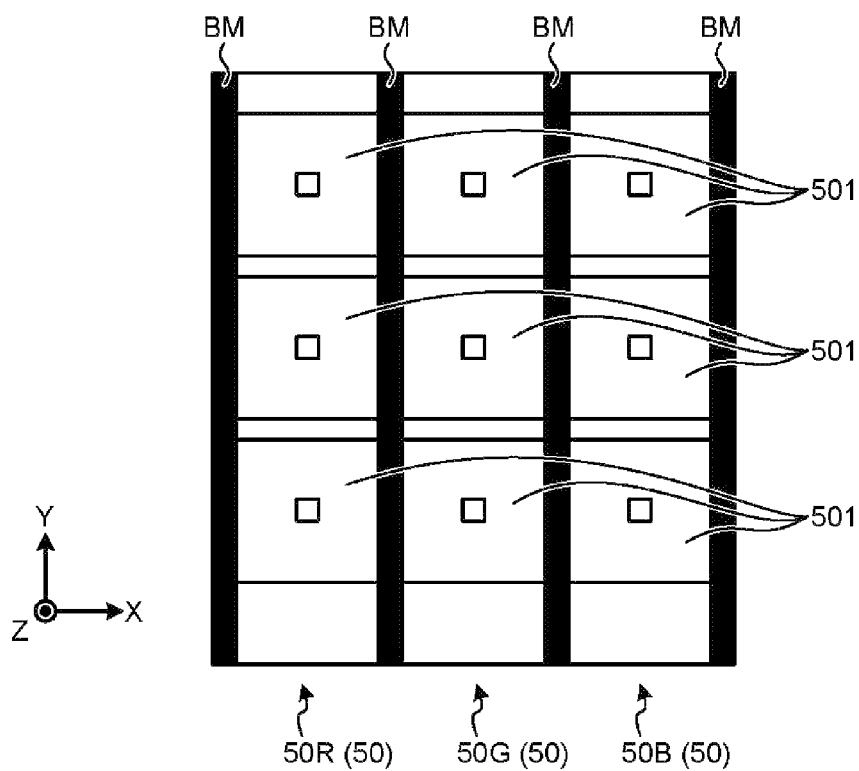
FIG. 10A is a diagram illustrating color pixels which are partitioned from each other by black matrices.
Figure 10B:
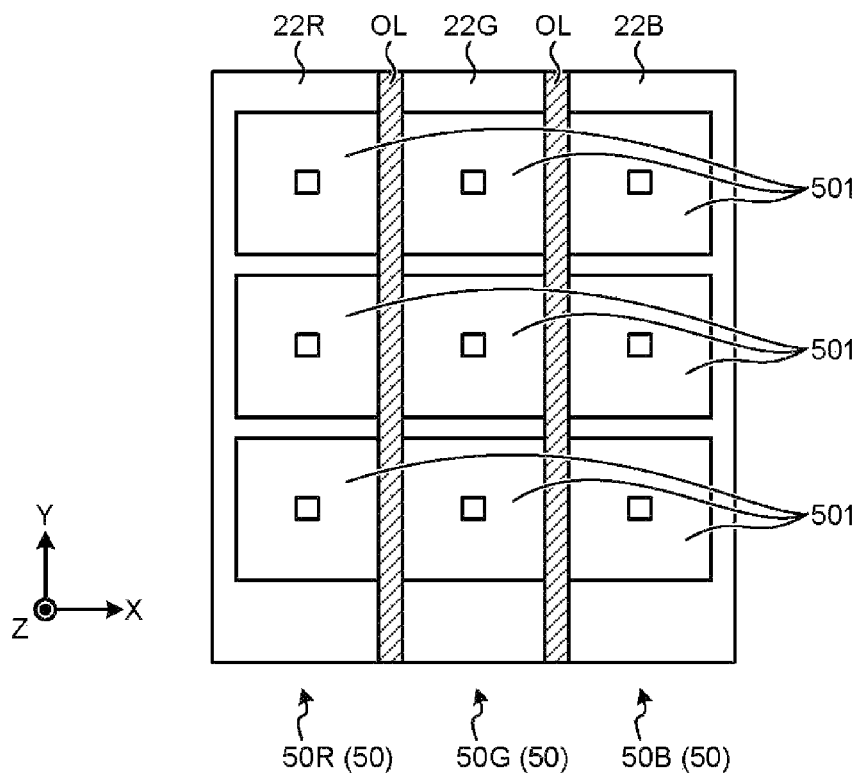
FIG. 10B is a diagram illustrating color pixels in which pixels are partitioned from each other by overlapping portions of color filters.

As illustrated in FIG. 10A, in a case of shielding spaces between sub-pixels 50R, 50G, and 50B (sub-pixels 50), a configuration may be employed in which the spaces between the sub-pixels 50R, 50G, and 50B are shielded using black matrices BM as a shielding zone, and the sub-pixels 50R, 50G, and 50B are partitioned by the same. Alternatively, as illustrated in FIG. 10B, a configuration may be employed in which the color filters 22R and 22G are partially overlapped with each other, and color filters 22G and 22B are partially overlapped with each other, whereby the spaces between the sub-pixels 50R, 50G, and 50B are shielded using respective overlapping portions OL, and the sub-pixels 50R, 50G, and 50B are partitioned by the same. In the case of the black matrix BM, a light transmittance becomes zero. In the case of the overlapping portion OL, a light transmittance is higher than that in the case of the black matrix BM, but the light transmittance is lower than that in a case where the color filters 22R, 22G, and 22B are not overlapped with each other. Therefore, in a case of performing transmissive display using the transflective display device 1 illustrated in FIG. 1, a space $65_B$, which is present between divided sub-pixels 501 adjacent in the Y direction and which extends in the X direction, is used instead of the black matrix BM or the overlapping portion OL. Accordingly, in a case of performing transmissive display using the transflective display device 1, it is preferable to improve usage efficiency of light in the space $65_B$ so as to improve display quality.

2-5. Orientation of Liquid Crystal Molecule

Figure 11:
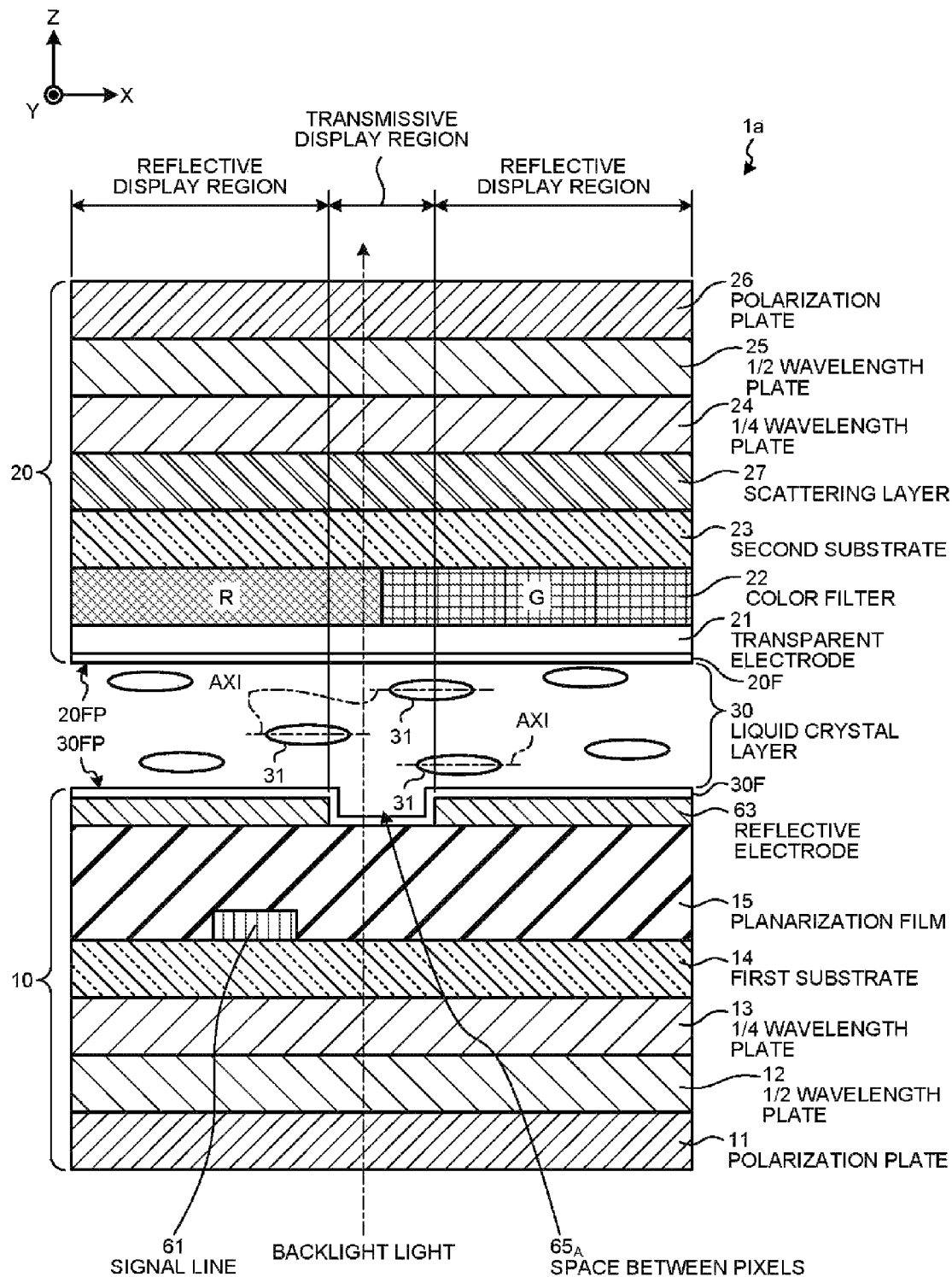
FIG. 11 is a cross-sectional view illustrating a transflective display device to which the present disclosure is applied.

To improve a transmittance of the space $65_B$ between the sub-pixels 50 or between the divided sub-pixels 501 illustrated in FIGS. 10A and 10B, it is preferable that the orientation of liquid crystal molecules 31 provided to a transflective display device 1a as illustrated in FIG. 11 be set to twisted nematic (TN) orientation. The twisted nematic orientation represents an orientation state in which, as illustrated in FIG. 11, a direction of long axis AX1 of liquid crystal molecules 31 of the liquid crystal layer 30 interposed between the first substrate 14 as the TFT substrate and the second substrate 23 as the CF substrate is parallel to surfaces 30FP and 20FP of an orientation film 30F on the first substrate 14 side and an orientation film 20F on the second substrate 23 side, and twisted between the first substrate 14 and the second substrate 23. The transflective display device 1a illustrated in FIG. 11 is obtained by adding a scattering layer 27 to the transflective display device 1 illustrated in FIG. 1. Thus, in the embodiment, as is the case with the transflective display device 1a, the scattering layer 27 may be provided, or as is the case with the transflective display device 1, the scattering layer 27 may not be provided. The scattering layer 27 will be described later.

Figure 12:
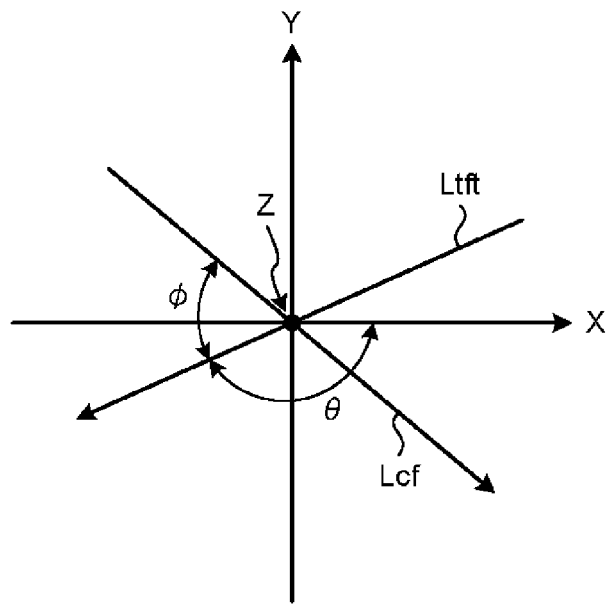
FIG. 12 is an explanatory diagram illustrating a rubbing direction.

In the embodiment, as illustrated in FIG. 12, a direction of rubbing (hereinafter, also referred to as a rubbing direction) is expressed by an angle with respect to the X direction in the XY plane, that is, the row direction of the plurality of pixels (sub-pixels) 50 arranged in matrix. The Y direction is a column direction of the plurality of pixels (sub-pixels) 50 arranged in matrix. A straight line Ltft in FIG. 12 represents a rubbing direction on the first substrate 14 side, and a straight line Lcf represents a rubbing direction on the second substrate 23 side. In the following description, each of the straight lines Ltft and Lcf is also referred to as a rubbing axis. The liquid crystal molecules 31, which come into contact with the first substrate 14 or the second substrate 23, more specifically, an orientation film provided on the surface of the first substrate 14 or the second substrate 23, are arranged in such a manner that the long axis AX1 thereof is parallel to the rubbing axis Ltft or Lcf of the corresponding orientation film.

An angle made by the rubbing axis and the X direction is referred to as a rubbing angle. In the embodiment, the rubbing angle on the first substrate 14 side is expressed by θ. In addition, an angle φ made by the rubbing axis Ltft on the first substrate 14 side and the rubbing axis Lcf on the second substrate 23 side is referred to as a twist angle. In the embodiment, with regard to the rubbing angle θ and the twist angle φ, rotation (counterclockwise rotation) around the Z axis from the X axis toward a first quadrant is set as a positive direction, and rotation (clockwise rotation) from the X axis toward a fourth quadrant is set as a negative direction.

Figure 13:
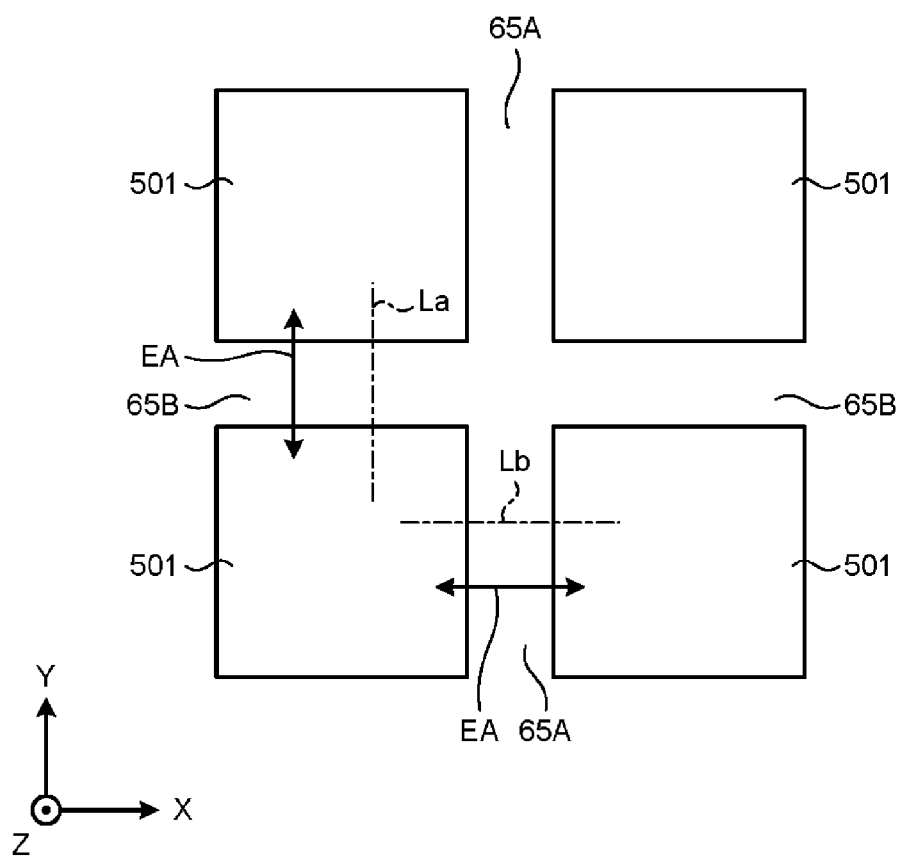
FIG. 13 is a plan view illustrating a plurality of divided pixel electrodes and a space between the divided pixels.

In the case in which the twist angle φ is 0° or ±180°, the orientation of liquid crystal molecules 31 is a homogeneous orientation. In FIG. 13, one-dot chain line La indicates a position of the space $65_B$ which is located between divided sub-pixels 501 adjacent in the Y direction and which extends in the X direction. A transmittance of the position indicated by one-dot chain line La is approximately 0.4 in the homogeneous orientation. However, when the twist angle φ exceeds 0° or 180°, the transmittance is rapidly raised, and increases to approximately 1.1 at an angle of approximately ±10° (or ±170°). Then, as the twist angle φ increases, the transmittance gradually decreases; however, even when the twist angle φ is ±90°, the transmittance at this angle reaches a value approximately two times that of the homogeneous orientation. On the other hand, in FIG. 13, one-dot chain line Lb in FIG. 13 indicates a position of the space $65_A$ which is located between divided sub-pixels 501 adjacent in the X direction and which extends in the Y direction. A transmittance of the position indicated by one-dot chain line Lb is approximately 0.2 in the homogeneous orientation. However, when the twist angle φ exceeds 0° or 180°, the transmittance is rapidly raised, and increases to approximately 0.8 at an angle of approximately ±40° (or) ±140°.

Then, as the twist angle φ increases, the transmittance gradually decreases; however, even when the twist angle φ is ±90°, the transmittance at this angle reaches a value approximately two times that of the homogeneous orientation.

As described above, when the twist angle φ is set to a value other than 0° or ±180°, that is, the orientation of the liquid crystal molecules 31 is set to a state other than the homogeneous orientation, the liquid crystal molecules 31 is set to a state of being twisted between the first substrate 14 and the second substrate 23. Accordingly, the transmittance of the spaces $65_A$ and $65_B$ between the divided sub-pixels 501 greatly increases compared to the homogeneous orientation. As a result, transmissive display may be performed while maintaining the same reflective display performance as the reflective display device. Then, the rubbing angle θ on the first substrate 14 side will be described.

The intensity of an electric field, which is formed in the XY plane due to a voltage applied between the reflective electrode 63 and the transparent electrode 21 illustrated in FIG. 11, is higher on the first substrate 14 side than on the second substrate 23 side. This is because the transparent electrode 21 on the second substrate 23 side is continuous in the XY plane, and thus a potential difference is not present in the XY plane, whereas the adjacent reflective electrodes 63 on the first substrate 14 side have a potential difference therebetween, and thus the potential difference is present in the XY plane. Accordingly, in the transmissive display by the transflective display devices 1 and 1a, the orientation direction of liquid crystal molecules 31 on the first substrate 14 side is more important. The orientation direction of the liquid crystal molecules 31 on the first substrate 14 side is determined by the rubbing direction on the first substrate 14 side.

In addition, when the liquid crystal molecules 31 present on the surface side of the reflective electrode 63 perform switch-operation to the Z direction, reflective display by the transflective display devices 1 or 1a is achieved. The transmissive display of the transflective display devices 1 and 1a is achieved when the liquid crystal molecules 31 present between the divided sub-pixels 501, between the sub-pixels 50, and the like perform switch-operating in the XY plane. Accordingly, in the transmissive display, it is preferable to consider the switch-operation of the liquid crystal molecules 31 that are present between the divided sub-pixels 501, between the sub-pixels 50, and the like.

Figure 14:
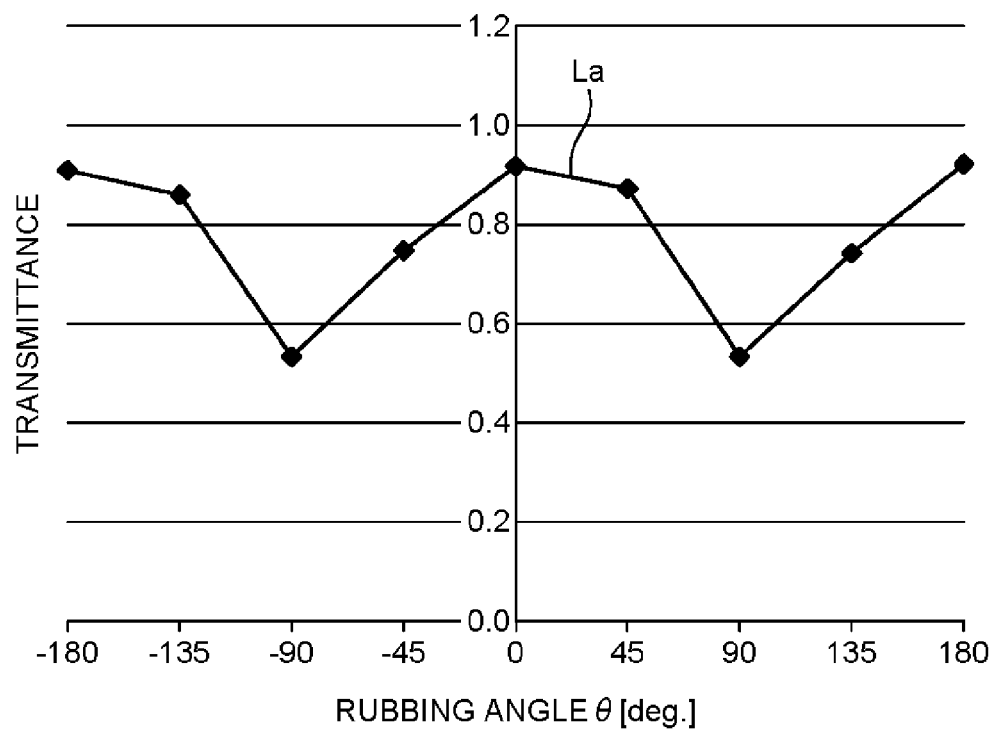
FIG. 14 is a diagram illustrating a relationship between the rubbing direction and transmittance.

FIG. 14 illustrates a simulation result when the twist angle φ is set to 70°, and the rubbing angle θ is varied. Solid line La in FIG. 14 represents a relationship between a transmittance at a position indicated by one-dot chain line La in FIG. 13 and the rubbing angle θ. As can be seen from the result in FIG. 14, it is preferable that the rubbing angle θ which determines the rubbing direction on the first substrate 14 side be within a range of −45° to 0°, 0° to 45°, −180° to −135°, or 135° to 180°. In these ranges, the transmittance of light in the space $65_B$ formed between the divided sub-pixels 501 adjacent in the Y direction may be made to be high. As a result, usage efficiency of light in the space $65_B$ may be effectively improved, and thus in the case of performing transmissive display using the transflective display devices 1a or 1, display quality may be improved.

Figure 15:
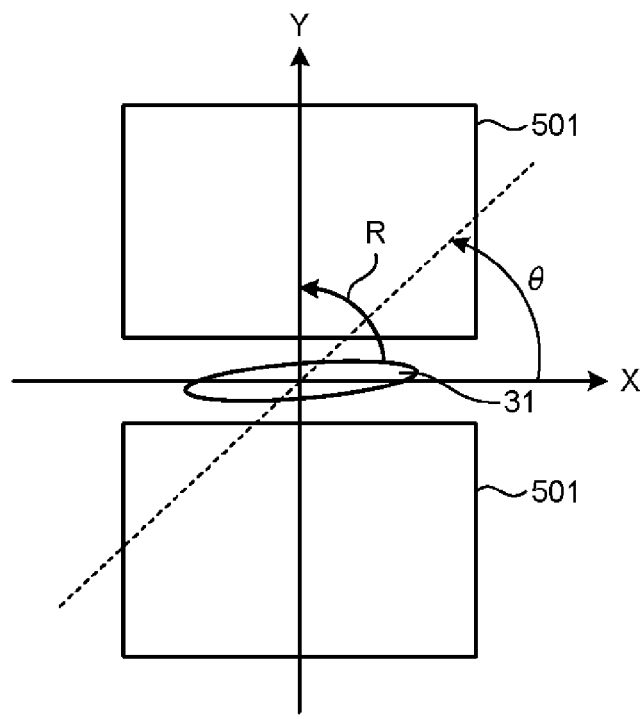
FIG. 15 is a schematic diagram illustrating a rubbing direction and a state of a liquid crystal molecule at the side of a TFT substrate as a first substrate before application of a voltage.
Figure 16:
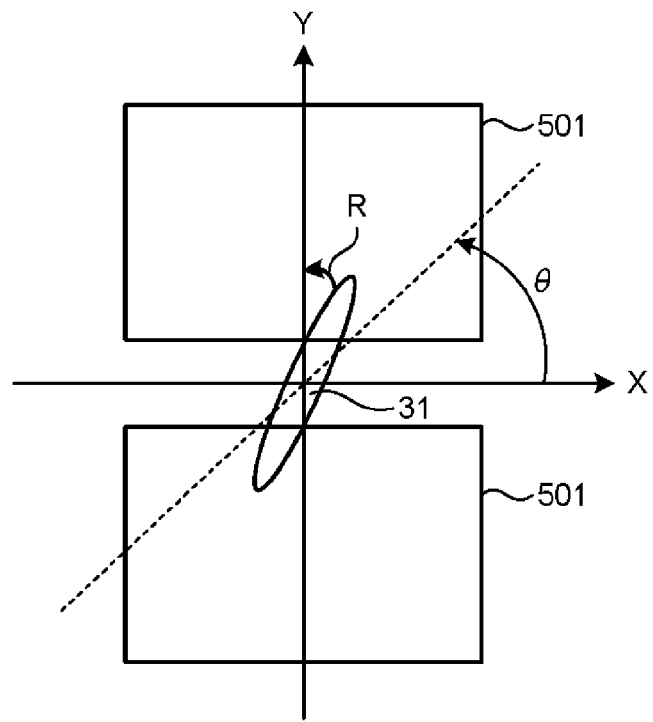
FIG. 16 is a schematic diagram illustrating a rubbing direction and a state of a liquid crystal molecule at the side of the TFT substrate as the first substrate before application of a voltage.
Figure 17:
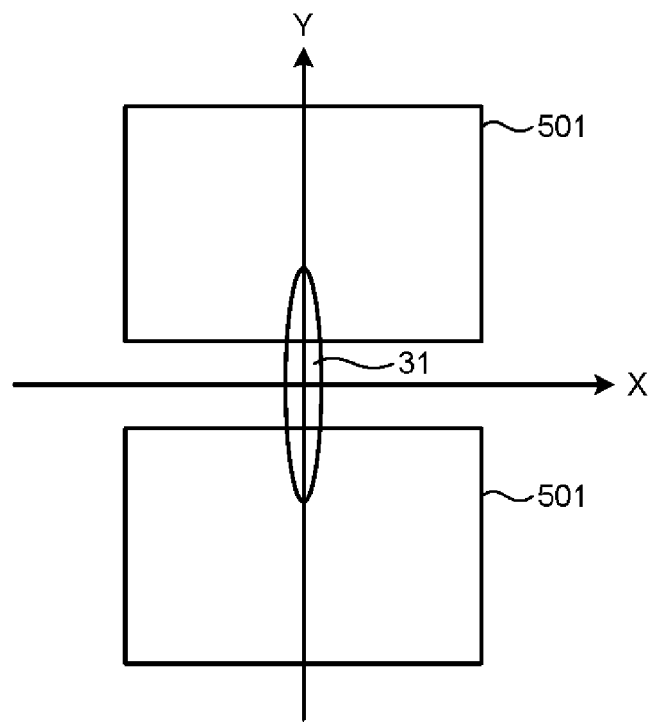
FIG. 17 is a schematic diagram illustrating a rubbing direction and a state of a liquid crystal molecule at the side of the TFT substrate as the first substrate during application of a voltage.

In the case in which the rubbing angle θ is relatively small, as illustrated in FIGS. 15 and 17, rotation of the liquid crystal molecules 31 in the XY plane between before and after application of a voltage increases, and as a result thereof, a transmittance increases. On the contrary, in the case in which the rubbing angle θ is relatively large, as illustrated in FIGS. 16 and 17, rotation of the liquid crystal molecules 31 in the XY plane between before and after application of a voltage decreases, and as a result thereof, a transmittance decreases. When the rubbing angle θ on the first substrate 14 side is set within the above-described range, the rotation of the liquid crystal molecules 31 in the XY plane is increased, and thus the transmittance is increased.

As described above, the black matrix BM or the overlapping portion OL is provided in the space $65_A$ between the divided sub-pixels 501 adjacent in the X direction. Accordingly, it is preferable to improve the transmittance of the space $65_B$ formed between the divided sub-pixels 501 that are adjacent in the Y direction so as to improve the entire transmittance of the transflective display devices 1a and 1, rather than increasing the transmittance of the space $65_A$. Accordingly, in the embodiment, the rubbing angle θ is set within the above-described range to improve the transmittance of the space $65_B$. According to this configuration, the entire transmittance of the transflective display devices 1a and 1 may be effectively improved. As a result, transmissive display may be performed while maintaining the same reflective display performance as the reflective display device.

2-6. Scattering Layer

The transflective display device 1a illustrated in FIG. 11 includes the scattering layer 27, which scatters light, on a side of the liquid crystal layer 30 in which light reflected by the reflective electrode 63 travels. More specifically, the transflective display device 1a includes the scattering layer 27 between the second substrate 23 and the ¼ wavelength plate 24. The scattering layer 27 is a non-isotropic or isotropic layer that scatters the light reflected by the reflective electrode 63, or backlight light that transmits through the space $65_A$ between pixels. As the scattering layer 27, for example, an LCF (Light Control Film) may be used.

The scattering layer 27 is a forward scattering layer generates large forward scattering and small backward scattering. The scattering layer 27 is an anisotropic scattering layer that scatters light incident from a specific direction. In the case in which light is incident from a specific direction on a polarization plate 26 side with respect to the second substrate 23, the scattering layer 27 hardly scatters the incident light and allows the incident light to transmit therethrough, and then greatly scatters light that returns to the scattering layer 27 after being reflected by the reflective electrode 63.

Figure 18:
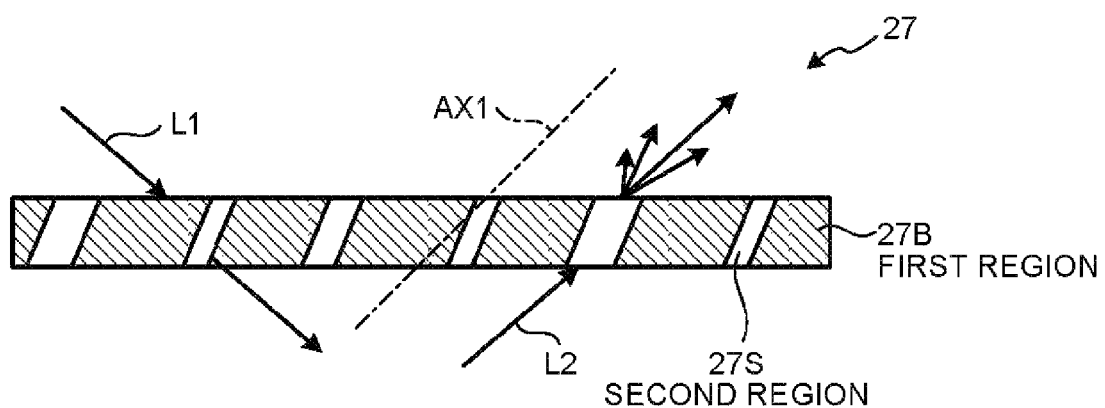
FIG. 18 is a cross-sectional view of a scattering layer.
Figure 19:
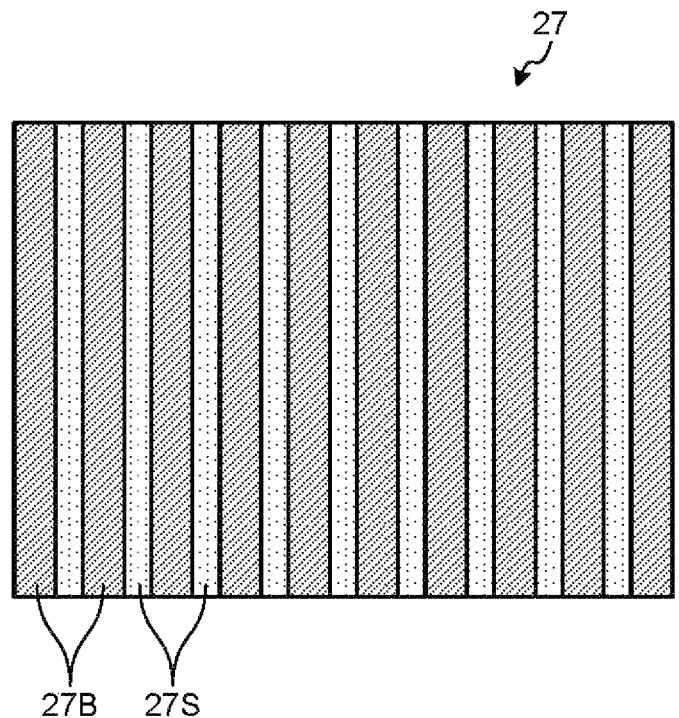
FIG. 19 is a plan view illustrating an example of the scattering layer.
Figure 20:
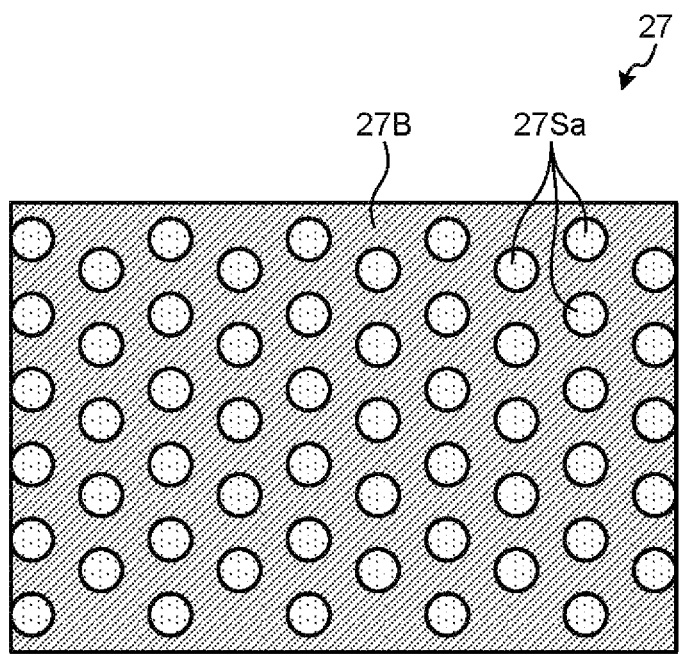
FIG. 20 is a plan view illustrating an example of the scattering layer.

For example, as illustrated in FIG. 18, when external light L1 is incident from a predetermined direction with respect to the second substrate 23, the scattering layer 27 allows the external light to transmit therethrough, and scatters light L2, which is reflected by the reflective electrode 63, of the transmitted light within a predetermined range around a scattering central axis AX1. The external light L1 is parallel light that is incident to the polarization plate 26 of the second substrate 23. The external light L1 may be non-polarized light or polarized light. For example, as illustrated in FIG. 18, the scattering layer 27 includes two kinds of regions (a first region 27B and a second region 27S), each having a different refractive index. As illustrated in FIG. 19, the scattering layer 27 may have a louver structure in which a plurality of plate-shaped second regions 27S are arranged in the first region 27B at a predetermined distance. Alternatively, as illustrated in FIG. 20, the scattering layer 27 may have a columnar structure in which second regions 27Sa having a column shape are arranged in the first region 27B.

For example, the scattering layer 27 is configured in such a manner that the first region 27B and the second region 27S extend in a thickness direction, and are inclined in a predetermined direction. For example, the scattering layer 27 is formed by irradiating a resin sheet, which is a mixture of two or more kinds of photopolymerizable monomers or oligomers, each having a different refractive index, with ultraviolet rays from an inclined direction. However, the scattering layer 27 may have a structure different from the above-described structure, and may be produced by a method different from the above-described method. The scattering layer 27 may be constituted by one layer or a plurality of layers. In the case in which the scattering layer 27 is constituted by the plurality of layers, these layers may have the same structure or structures different from each other.

It is preferable that the scattering central axis AX1 of the scattering layer 27 face, for example, a main viewing angle direction. The scattering central axis AX1 may face a direction different from the main viewing angle direction. In any case, when the scattering layer 27 is used, the direction of the scattering central axis AX1 is set such that brightness in the main viewing angle direction is brightest due to the effect of the scattering layer 27, that is, the reflectance in the main viewing angle direction is highest. The main viewing angle corresponds to an orientation in which when a user of the transflective display device 1a uses the transflective display device 1a, the user views an image display surface. In the case in which the image display surface having a rectangular shape, the main viewing angle corresponds to an orientation perpendicular to a side, which is closest to the user, among sides of the image display surface.

In a case of allowing backlight light or the like to transmit through the space $65_A$ between pixels, there is a possibility that a variation in transmission of the backlight light may increase due to patterning accuracy of the reflective electrode 63, a deviation in overlapping between the reflective electrode 63 and the second substrate 23, or the like. Particularly, in the case in which silver is used as the reflective electrode by using a wet process, the above-described variation may significantly increase. Since the transmitted light is scattered by the scattering layer 27, there is an advantage that the above-described variation may be equalized.

2-7. Specific Example

A specific example of the transflective display device according to the embodiment will be described. Hereinafter, a case in which the normally black mode is employed as a display mode, and an ECB (Electrically Controlled Birefringence) mode is employed as an operation mode will be described as an example. However, the operation mode is not limited to the ECB mode, and a VA (Vertically Aligned) mode, an FFS (Fringe Field Switching) mode, or the like may be employed.

An example will be described with reference to a cross-section of FIG. 11 which illustrates a cross-sectional structure of two pixels adjacent in a row direction (X direction) of the transflective display device 1a according to one example of the embodiment. In FIG. 11, the same reference numerals are given to the same portions as in FIG. 1. As illustrated in FIG. 11, the first panel unit 10 has a configuration in which the polarization plate 11, the ½ wavelength plate 12, the ¼ wavelength plate 13, the first substrate 14 that is a TFT substrate, and the planarization film 15 are formed in order from a side opposite to the liquid crystal layer 30, and the reflective electrode 63 is formed on the planarization film 15 for each pixel.

In the first panel unit 10, the reflective electrode 63 is formed to have substantially the same size as a pixel size. A region of the reflective electrode 63 is a reflective display region (reflective display portion). In addition, the space $65_A$ is formed along the column direction (Y direction) between the reflective electrodes 63 of two pixels adjacent in the row direction (X direction). Although not illustrated in the cross-section, as illustrated in FIG. 4, the space $65_B$ is formed along the row direction between the reflective electrodes 63 of two pixels adjacent in the column direction.

The signal lines 61, through which video signals are transmitted to respective pixels for each pixel column, are wired on the first substrate 14. The signal lines 61 are formed within a reflective display region so as not to block the space $65_A$ extending along the column direction, preferably, so as not to overlap the space $65_A$. Although not illustrated in the cross-section, the scanning lines 62 (refer to FIG. 4), through which scanning signals are transmitted to respective pixels for each pixel row, are formed within a reflective display region so as not to block the space $65_B$ extending the row direction, preferably, so as not to overlap the space $65_B$.

The spaces $65_A$ and $65_B$ between the reflective electrode 63 of the pixels, which are not overlapped by the signal lines 61 and the scanning lines 62, are used as a transmissive display region. Here, the pixel structure according to this example is a single gap structure in which the thickness of the liquid crystal layer 30 is the same between the reflective display region and the transmissive display region, that is, a cell gap is the same in each region.

The second panel unit 20, which is opposite to the first panel unit 10 with the liquid crystal layer 30 interposed therebetween, has a configuration in which the transparent electrode 21, the color filter 22, the second substrate 23, the ¼ wavelength plate 24, the ½ wavelength plate 25, and the polarization plate 26 are provided in order from the liquid crystal layer 30 side. Here, a pixel structure with respect to two pixels adjacent in the row direction, for example, an R sub-pixel that displays a red color, and a G sub-pixel that displays a green color is illustrated.

Figure 21A:
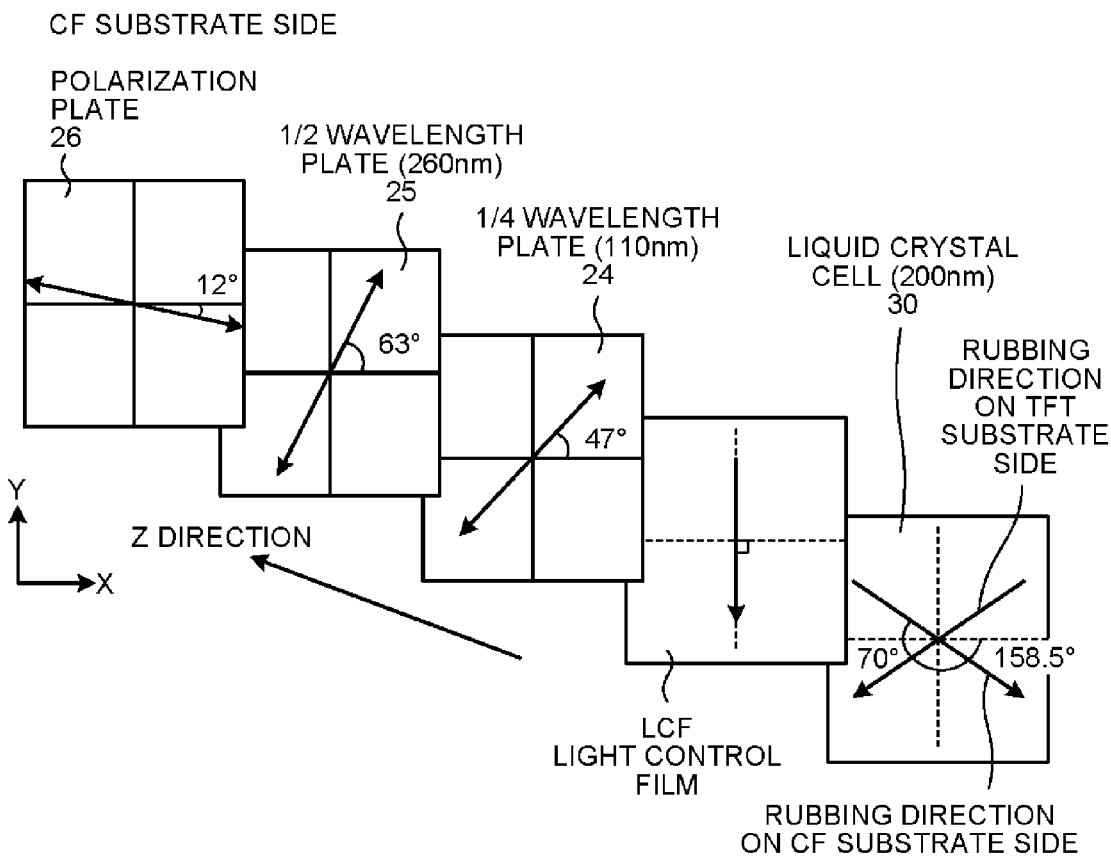
FIG. 21A is a diagram illustrating an example of an optical design of a normally black ECB mode in a case of a single-gap structure.
Figure 21B:
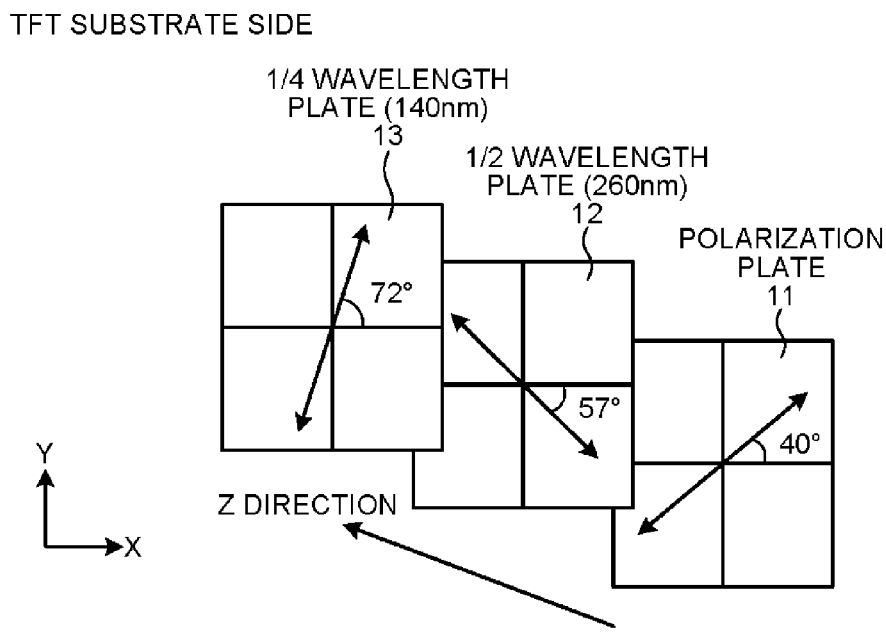
FIG. 21B is a diagram illustrating an example of an optical design of a normally black ECB mode in a case of a single-gap structure.

An example of an optical design of the ECB mode of the normally black mode in a case of a single-gap structure is illustrated in FIGS. 21A and 21B. FIGS. 21A and 21B illustrate axial directions of constituent members of the first panel unit 10, a liquid crystal cell (liquid crystal layer 30), and constituent members of the second panel unit 20. Specifically, as illustrated in FIG. 21B, with regard to the first panel unit 10 side, an absorption axis direction of the polarization plate 11, an extending axis direction of the ½ wavelength plate 12, and an extending axis direction of the ¼ wavelength plate 13 are illustrated, respectively. In addition, as illustrated in FIG. 21A, with regard to the second panel unit 20 side, a rubbing directions of a liquid crystal cell on the TFT substrate side and the CF substrate side, a scattering central axis direction of the LCF (scattering layer 27), an extending axis direction of the ¼ wavelength plate 24, an extending axis direction of the ½ wavelength plate 25, and an absorption axis direction of the polarization plate 26 are illustrated, respectively.

In FIGS. 21A and 21B, respective numeral values represent an angle in an axial direction, or a phase difference (retardation). The phase difference is a numeral value in terms of a wavelength when light with a wavelength 550 [nm] is incident to each constituent element of the first and second panel units 10 and 20. Here, as the specific example, a case of the single gap structure has been described as an example; however, a multi-gap structure as illustrated in FIG. 22, in which a cell gap in the reflective display region and a cell gap in the transmissive display region are different from each other, may be employed.

Figure 22:
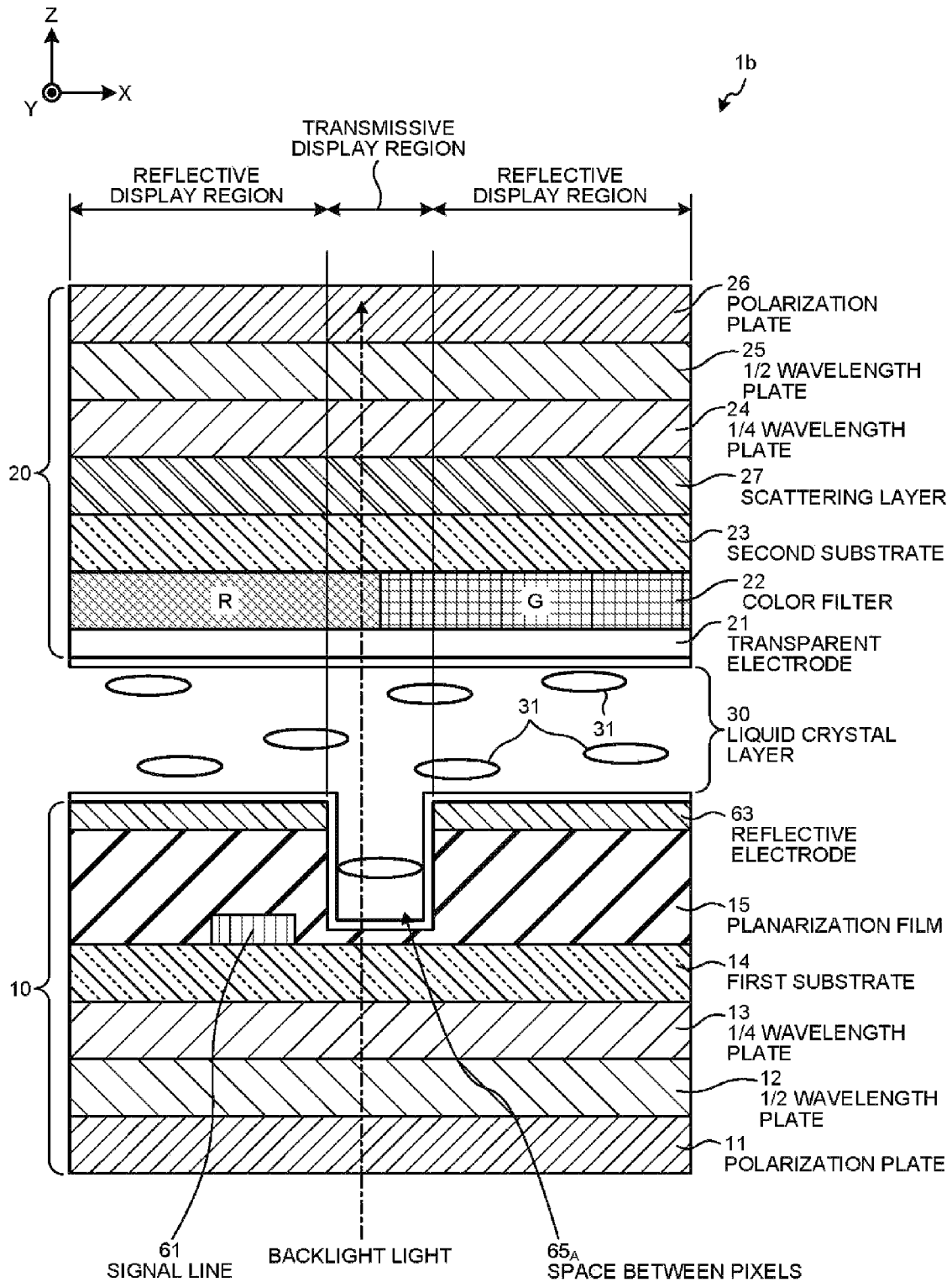
FIG. 22 is a cross-sectional view illustrating a cross-sectional structure of two pixels adjacent to each other in a row direction of a transflective display device of a multi-gap structure.

However, as illustrated in FIG. 22, in the case in which the transflective display device 1b has the multi-gap structure, it is necessary to form a groove in the space $65_A$ ($65_B$) between the reflective electrode 63 of pixels so as to form a step difference between the reflective display region and the transmissive display region, an thereby the number of processes increases compared to the case of the signal gap structure. Therefore, from the viewpoint of the process, the single gap structure, in which the number of processes may be smaller than that of the multi-gap structure, is preferable.

Figure 23:
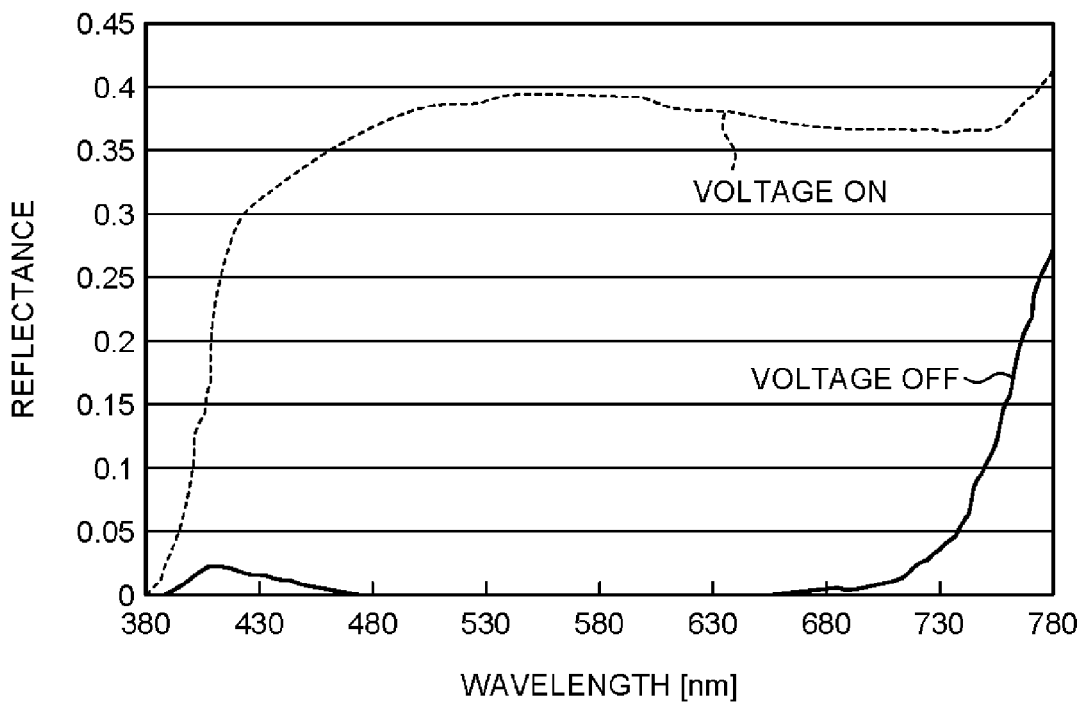
FIG. 23 is a diagram illustrating a calculation result of a spectrum of a reflective display region.
Figure 24:
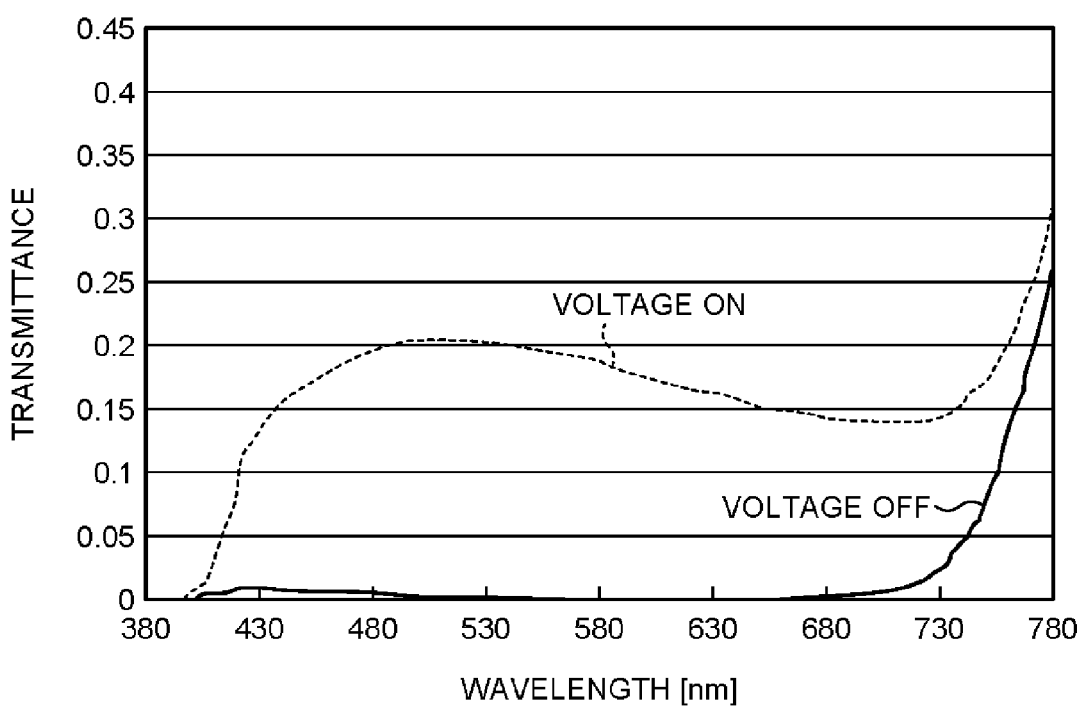
FIG. 24 is a diagram illustrating a calculation result of a spectrum of a transmissive display region.

FIGS. 23 and 24 illustrate calculation results of spectrums of the reflective display region and the transmissive display region, in cases of a voltage ON and a voltage OFF regarding upper and lower electrodes that are the counter electrode (transparent electrode 21) and the pixel electrode (reflective electrode 63) with the optical design (single gap structure) illustrated in FIGS. 21A and 21B. Here, "voltage ON" represents a state in which a voltage is applied between the upper and lower electrodes, and "voltage OFF" represents a state in which a voltage is not applied between the upper and lower electrodes.

FIG. 23 illustrates calculation results of a spectrum of a reflectance in the reflective display region, and FIG. 24 illustrates calculation results of a spectrum of a transmittance in the transmissive display region. The calculation results of spectrums are ones to be obtained in a state in which an electric field by the upper and lower electrodes completely operates on liquid crystal molecules rather than ones one obtained by reproducing an electric field distribution between pixels. Due to the single gap structure, a phase difference of the transmissive display region is small, and thus a transmittance is low, unlike the transflective type of a common multi-gap structure.

3. Modification

In the above-described embodiment, the signal lines 61 and the scanning lines 62 are formed as straight strip wirings, and have a wiring structure in which each of the signal lines 61 is configured to cross the space $65_B$, which is extending in the row direction, at an intermediate position of a pixel, and each of the scanning lines 62 is configured to cross the space $65_A$, which is extending in the column direction, at an intermediated position of a pixel (refer to FIG. 4). However, the wiring structure of the signal lines 61 and the scanning lines 62 is illustrative only, and is not limited thereto.

Figure 25:
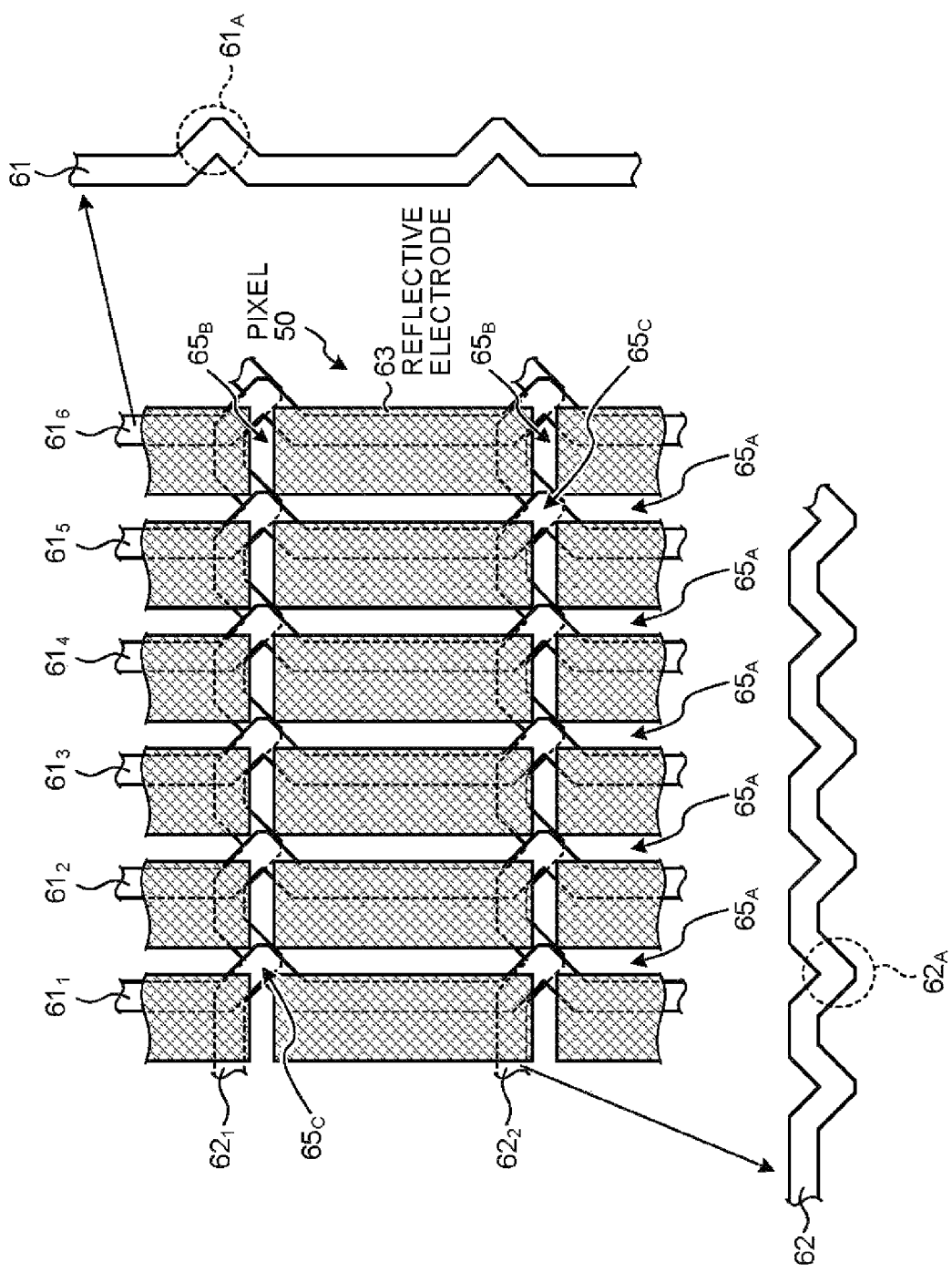
FIG. 25 is a plan view illustrating an electrode structure of a pixel portion according to a modification.

For example, as illustrated in FIG. 25, a wiring structure, in which the signal lines 61 and the scanning lines 62 are formed as a zigzag wiring and are wired as described below, may be considered. That is, in a space between pixels adjacent in the row direction, each of the signal lines 61 is wired to pass through an intersection $65_C$ of the space $65_A$ formed along the column direction and the space $65_B$ formed along the row direction, specifically, in such a manner that a bent portion $61_A$ of the signal line 61 is located at the intersection $65_C$. In addition, in a space between pixels adjacent in the column direction, each of the scanning lines 62 is wired to pass through the intersection $65_C$ of the space $65_B$ formed along the row direction and the space $65_A$ formed along the column direction, specifically, in such a manner that a bent portion $62_A$ of the scanning lines 62 is located at the intersection $65_C$.

As described above with reference to FIGS. 13 and 14, liquid crystal molecules do not move at all at the position C of the central portion between pixels, and thus it is considered that the center of the intersection $65_C$ of the space $65_A$ formed along the column direction and the space $65_B$ formed along the row direction has the most adverse effect on transmissive display. Accordingly, when the signal lines 61 and the scanning lines 62 are formed to pass through the intersection $65_C$ like the above-described wiring structure instead of passing through the spaces $65_A$ and $65_B$ at intermediate positions of a pixel, more satisfactory transmissive display may be realized.

4. Electronic Apparatus

The above-described transflective display device according to the present disclosure may be used as a display unit (display device) of any fields of electronic apparatuses which display video signals input to the electronic apparatuses or video signals generated in the electronic apparatuses as an image or a video.

The transflective display device according to the present disclosure is preferably used as a display unit (display device) of portable electronic apparatus that is frequently used in outdoor environments among the all fields of electronic apparatuses. Examples of the portable electronic apparatus include a portable information apparatuses such as digital cameras, video cameras, PDAs (Personal Digital Assistants), gaming devices, note-type personal computers, electronic books; and portable communication apparatuses such as cellular phones; and the like.

As is clear from the description of the embodiment, the transflective display device according to the present disclosure may perform transmissive display while maintaining the same reflective display performance as the reflective display device, and thus characteristics that power consumption is low and a screen is easy to view under a bright environment, which are characteristics of the reflective display device, may be sufficiently achieved. Accordingly, when being used as a display unit of a portable electronic apparatus among the electronic apparatuses in all fields of electronic apparatuses, the transflective display device according to the present disclosure may largely contribute to low power consumption of the portable electronic apparatus.

Hereinafter, description will be given to electronic apparatuses that use the transflective display devices 1 or 1a as a display unit, that is, a specific example of the electronic apparatus according to the present disclosure.

Figure 26A:
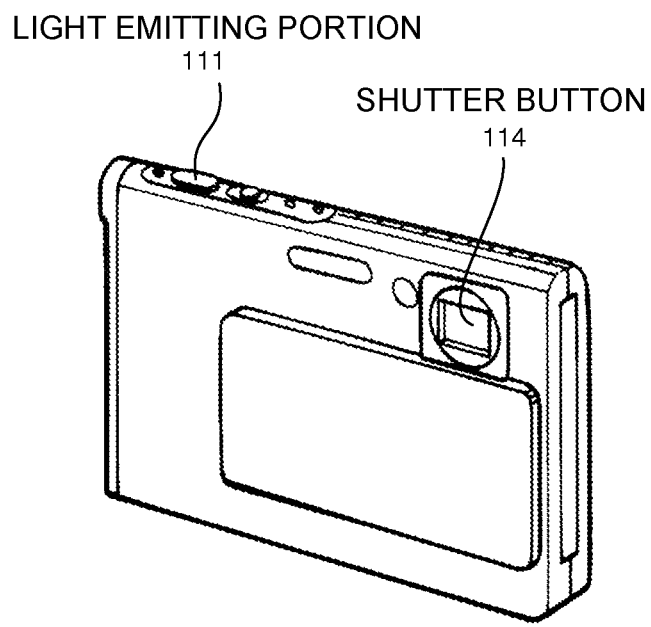
FIG. 26A is a perspective view illustrating external appearance of a digital camera to which the present disclosure is applied.
Figure 26B:
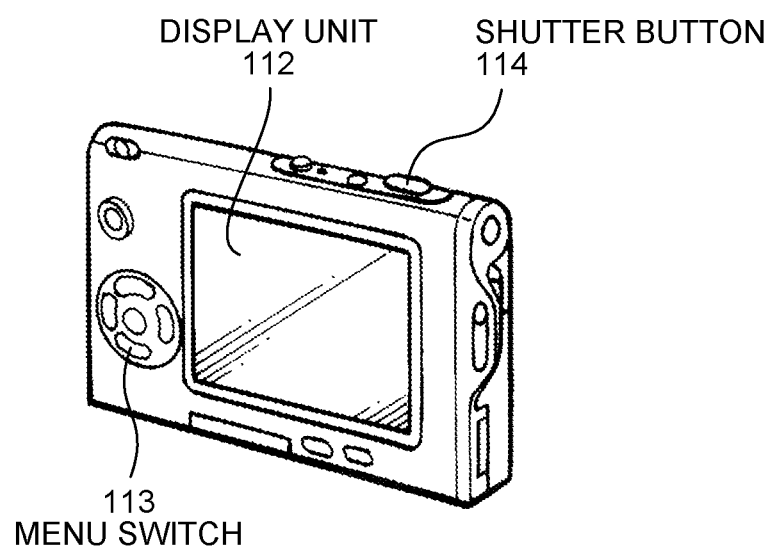
FIG. 26B is a perspective view illustrating external appearance of the digital camera to which the present disclosure is applied.

FIG. 26A illustrates external appearance of a digital camera to which the present disclosure is applied, and illustrates a perspective view which is seen from the front side. FIG. 26B illustrates a perspective view that is seen from the rear side. The digital camera according to the application example includes a light emitting portion 111 for flash, a display unit 112, a menu switch 113, a shutter button 114, and the like, and is prepared by using the transflective display devices 1 or 1a according to the present disclosure as the display unit 112.

Figure 27:
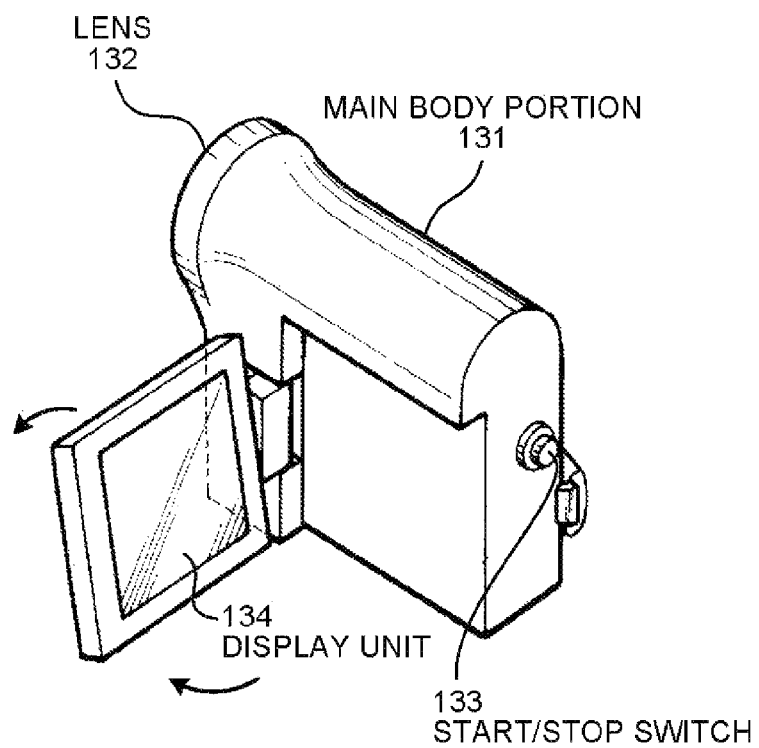
FIG. 27 is a perspective view illustrating external appearance of a video camera to which the present disclosure is applied.

FIG. 27 illustrates a perspective view illustrating external appearance of a video camera to which the present disclosure is applied. The video camera according to the application example includes a main body portion 131, a lens 132 for capturing an object which is provided at a side surface facing the front side, a start/stop switch 133 during capturing, a display unit 134, and the like, and is prepared by using the transflective display device 1 or 1a according to the present disclosure as the display unit 134.

Figure 28:
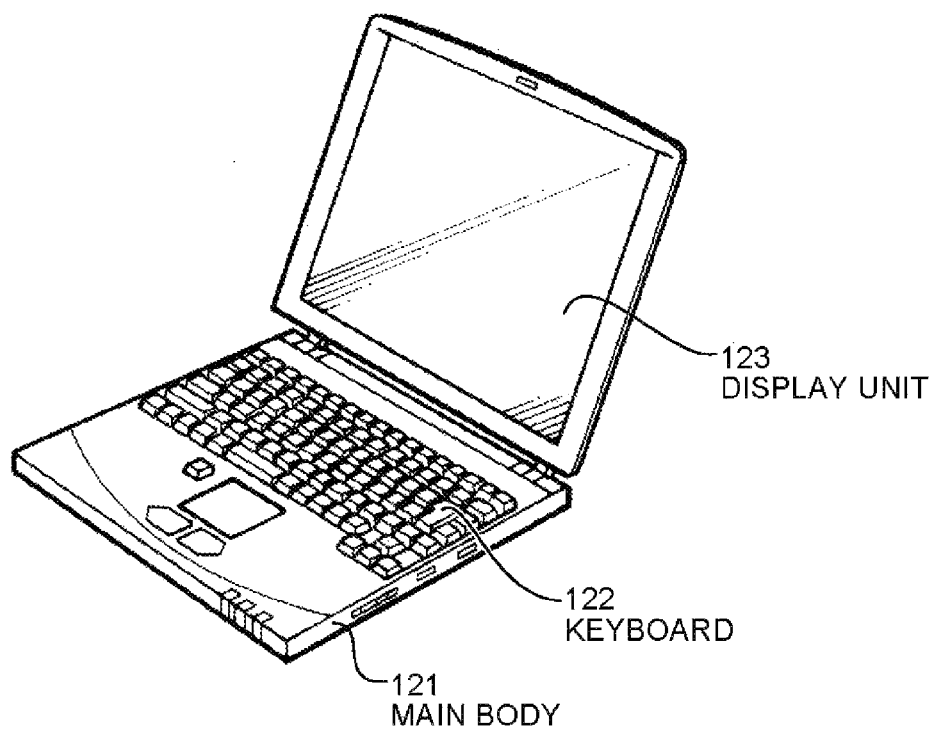
FIG. 28 is a perspective view illustrating external appearance of a note-type personal computer to which the present disclosure is applied.

FIG. 28 illustrates a perspective view illustrating external appearance of a note-type personal computer to which the present disclosure is applied. The note-type personal computer according to the application example includes a keyboard 122 that is provided to a main body 121 and is operated when inputting characters and the like, a display unit 123 that displays an image, and the like, and is prepared by using the transflective display device 1 or 1a according to the present disclosure as the display unit 123.

Figure 29A:
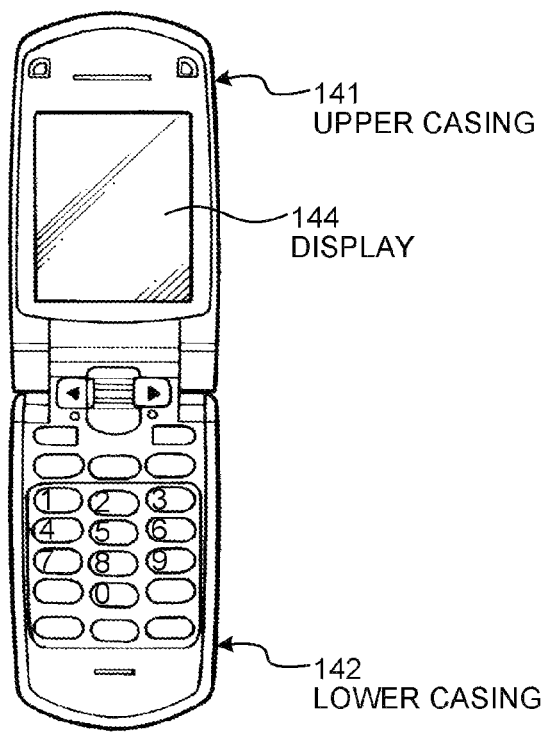
FIG. 29A is a front view illustrating a cellular phone, to which the present disclosure is applied, in an opened state.
Figure 29B:
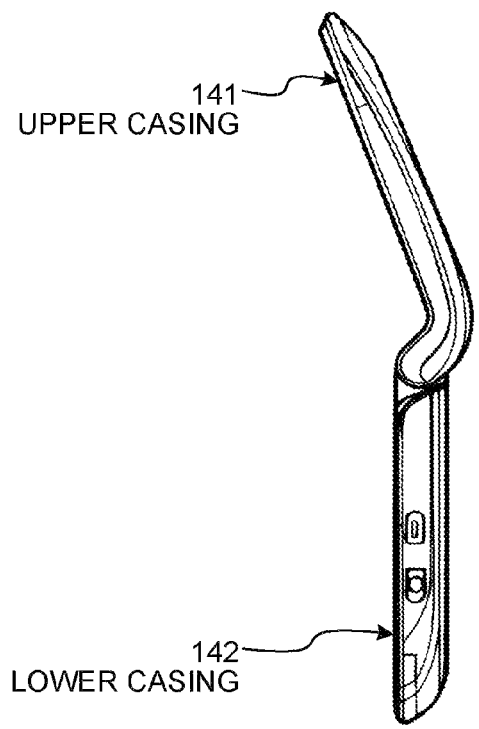
FIG. 29B is a side view illustrating the cellular phone to which the present disclosure is applied.
Figure 29C:
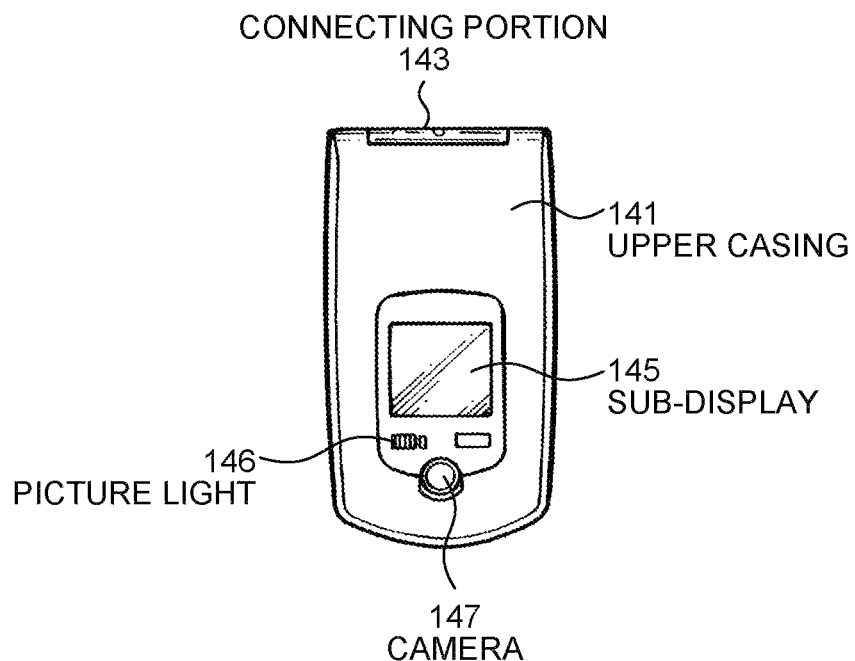
FIG. 29C is a front view illustrating the cellular phone, to which the present disclosure is applied, in a closed state.
Figure 29D:
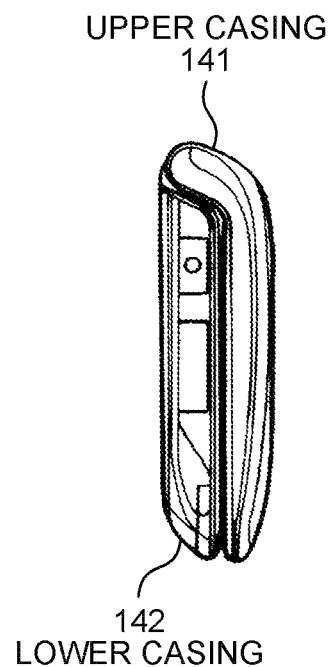
FIG. 29D is a left side view illustrating the cellular phone to which the present disclosure is applied.
Figure 29E:
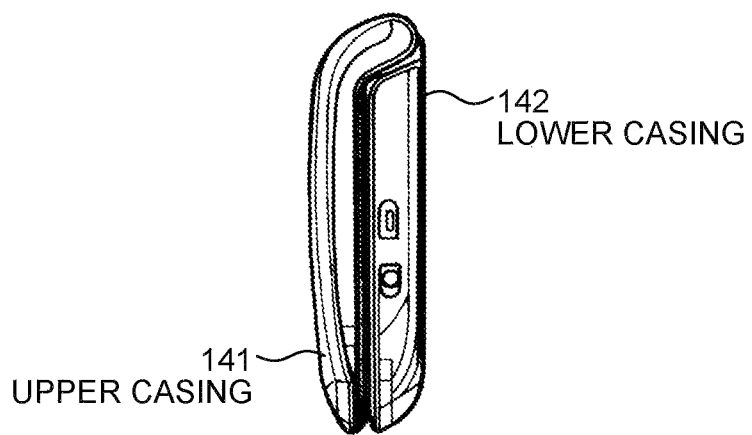
FIG. 29E is a right side view illustrating the cellular phone to which the present disclosure is applied.
Figure 29F:
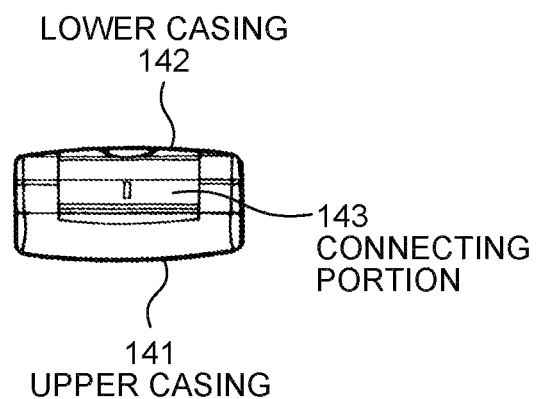
FIG. 29F is a top view illustrating the cellular phone to which the present disclosure is applied.
Figure 29G:
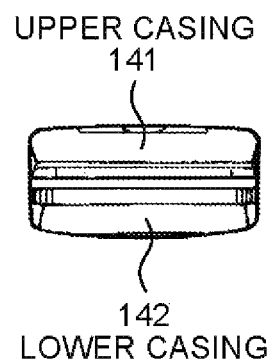
FIG. 29G is a bottom view illustrating the cellular phone to which the present disclosure is applied.

FIGS. 29A to 29G illustrate external views illustrating a portable communication apparatus to which the present disclosure is applied, for example, a portable cellular phone. FIG. 29A illustrates a front view in an opened state, FIG. 29B is a side view, FIG. 29C is a front view in a closed state, FIG. 29D is a left side view, FIG. 29E is a right side view, FIG. 29F is a top view, and FIG. 29G is a bottom view.

The portable cellular phone according to the application example includes an upper casing 141, a lower casing 142, a connecting portion (here, a hinge portion) 143, a display 144, a sub-display 145, a picture light 146, a camera 147, and the like. In addition, the portable cellular phone according to the application example is prepared by using the transflective display device 1 or 1a according to the present disclosure as the display 144 or the sub-display 145.

5. Aspects of Present Disclosure

The present disclosure includes the following aspects:
(1) A transflective display device, comprising:
a first substrate on which a first orientation film and a plurality of reflective electrodes formed for each of pixels are provided;
a second substrate on which a second orientation film and a transparent electrode that is opposite to the reflective electrodes are provided; and
a liquid crystal layer including a plurality of liquid crystal molecules provided between the first substrate and the second substrate, a direction of long axis of the liquid crystal molecules being parallel to surfaces of the first and second orientation films and twisted between the first substrate and the second substrate, wherein
the reflective electrode is configured to perform reflective display, and
a space between the reflective electrodes of the adjacent pixels is configured to perform transmissive display.
(2) The transflective display device according to (1), wherein
a rubbing direction of the first orientation film has an angle within a range of −45° to 0°, 0° to 45°, −180° to −135°, or 135° to 180° with respect to a row direction of the pixels arranged in matrix.
(3) The transflective display device according to (1), wherein
the liquid crystal layer is configured to be driven by a frame inversion driving method in which a polarity of signals for driving the pixels is inverted with the same polarity for each frame with respect to all of the pixels.
(4) The transflective display device according to (3), wherein the liquid crystal layer has a display mode of a normally black mode.
(5) The transflective display device according to (1), further comprising a wiring that is formed not to block the space between the reflective electrodes of the adjacent pixels.

(6) The transflective display device according to (5), wherein the wiring is formed to avoid the space between the reflective electrodes of the adjacent pixels.

(7) The transflective display device according to (6), wherein the wiring is a signal line which is formed for each pixel column with respect to matrix arrangement of the pixels, and through which signals for driving the pixels are transmitted, and the signal line is wired to avoid the space formed between pixels along a pixel arrangement direction of the pixel column.

(8) The transflective display device according to (7), wherein in a space between pixels adjacent in the pixel arrangement direction of a pixel row, the signal line is wired to pass through an intersection of the space formed along the pixel arrangement direction of the pixel column, and the space formed along the pixel arrangement direction of the pixel row.

(9) The transflective display device according to (6), wherein the wiring is a scanning line which is formed for each pixel row with respect to a matrix arrangement of the pixels, and through which signals for selecting the pixels are transmitted, and the scanning line is wired to avoid the space formed between pixels along a pixel arrangement direction of the pixel row.

(10) The transflective display device according to (9), wherein in a space between pixels adjacent in the pixel arrangement direction of a pixel column, the scanning line is wired to pass through an intersection of the space formed along the pixel arrangement direction of the pixel row, and the space formed along the pixel arrangement direction of the pixel column.

(11) The transflective display device according to (1), wherein the pixels have a memory function.

(12) The transflective display device according to (11), wherein the pixels have a memory unit that stores data.

(13) The transflective display device according to (11), wherein the pixels use memory-type liquid crystal.

(14) An electronic apparatus having a transflective display device, the transflective display device comprising:

a first substrate on which a first orientation film and a plurality of reflective electrodes formed for each of pixels are provided;

a second substrate on which a second orientation film and a transparent electrode that is opposite to the reflective electrodes are provided; and a liquid crystal layer including a plurality of liquid crystal molecules provided between the first substrate and the second substrate, a direction of long axis of the liquid crystal molecules being parallel to surfaces of the first and second orientation films and twisted between the first substrate and the second substrate, wherein the reflective electrode is configured to perform reflective display, and a space between the reflective electrodes of the adjacent pixels is configured to perform transmissive display.

(15) A method of driving a transflective display device including a first substrate on which a first orientation film and a plurality of reflective electrodes formed for each of pixels are provided, a second substrate on which a second orientation film and a transparent electrode that is opposite to the reflective electrodes are provided, and a liquid crystal layer including a plurality of liquid crystal molecules provided between the first substrate and the second substrate, the method comprising:

performing reflective display using the reflective electrodes; and performing transmissive display using a space between the reflective electrodes of the adjacent pixels, wherein a direction of long axis of the liquid crystal molecules is parallel to surfaces of the first and second orientation films and twisted between the first substrate and the second substrate.

In a transflective display device, an electronic apparatus having a transflective display device, and a method is for driving a transflective display device that have above-described configurations, performing transmissive display using a space between the reflective electrodes of the adjacent pixels means using the space between the pixels as a space between the reflective electrodes. Thus, it is not necessary to secure a dedicated area for transmissive display in a pixel. This means that it is possible to secure the same size (area) of a reflective display region for a pixel as that of a reflective display region of a reflective display device. Accordingly, it is possible to perform transmissive display through the space between reflective electrodes of adjacent pixels while maintaining the same reflective display performance as in the reflective display device.

In addition, in the liquid crystal layer, a direction of long axis of liquid crystal molecules provided between the first substrate and the second substrate is parallel to the surfaces of the first substrate and the second substrate, and twisted between the first substrate and the second substrate. Accordingly, transmittance in a space between pixels may be improved. As a result, it is possible to perform transmissive display through the space between reflective electrodes of adjacent pixels while maintaining the same reflective display performance as in the reflective display device.

According to one embodiment of the present disclosure, the transmissive display is performed using a space between reflective electrodes of adjacent pixels, and thus the transmissive display may be performed while maintaining the same reflective display performance as in the reflective display device.

Although the present disclosure has been described, the present disclosure is not limited thereto. In addition, the components in the above-described disclosure include those which are easily conceived by persons skilled in the art, those which are substantially identical thereto, and those in a scope of so-called equivalents. Further, the above-described components can be combined with each other as necessary. The components can be arbitrarily omitted, replaced, or modified within a scope that does not depart from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A transflective display device, comprising:
a first substrate on which a first orientation film and pixel units are provided, where in a plane of the first substrate a Y direction and a X direction are perpendicular to each other, and a Z direction is perpendicular to the plane of the first substrate;

a second substrate on which a second orientation film and a transparent electrode that is opposite to the reflective electrodes are provided; and a liquid crystal layer including a plurality of liquid crystal molecules provided between the first substrate and the second substrate, a direction of long axis of the liquid crystal molecules being parallel to surfaces of the first and second orientation films and twisted between the first substrate and the second substrate, wherein each of the pixel units includes a plurality of sub-pixels arranged in the X direction;

wherein each of the sub-pixels includes:
   a color filter corresponding to a color of the sub-pixel; and
   a reflective electrode, with spaces existing between reflective electrodes of adjacent sub-pixels, wherein electrodes for driving the liquid crystal layer are provided on a liquid crystal layer side of the first substrate except in a space between adjacent reflective electrodes, wherein a light shielding member is provided in at least one of a first space and a second space, and is not provided in a third space, the first space being a space between adjacent pixel units in the X direction, the second space being a space between adjacent sub-pixels within the same pixel unit in the X direction, the third space being a space between adjacent pixel units in the Y direction, wherein the reflective electrode is configured to perform reflective display, and wherein the third space is used to perform transmissive display.

2. The transflective display device according to claim 1, wherein
   a rubbing direction of the first orientation film has an angle within a range of −45° to 0°, 0° to 45°, −180° to −135°, or 135° to 180° with respect to a row direction of the pixel units arranged in matrix.

3. The transflective display device according to claim 1, wherein
   the liquid crystal layer is configured to be driven by a frame inversion driving method in which a polarity of signals for driving the pixel units is inverted with the same polarity for each frame with respect to all of the pixel units.

4. The transflective display device according to claim 3, wherein the liquid crystal layer has a display mode of a normally black mode.

5. The transflective display device according to claim 1, further comprising a wiring that is formed not to block the spaces between the reflective electrodes of the adjacent sub-pixels.

6. The transflective display device according to claim 5, wherein the wiring is formed to avoid the spaces between the reflective electrodes of the adjacent sub-pixels.

7. The transflective display device according to claim 6, wherein
   the wiring is a signal line which is formed for each pixel column with respect to a matrix arrangement of the pixel units, and through which signals for driving the pixel units are transmitted, and
   the signal line is positioned to avoid the spaces formed between pixel units along a pixel arrangement direction of the pixel column.

8. The transflective display device according to claim 7, wherein in a space between adjacent pixel units in the pixel arrangement direction of a pixel row, the signal line is wired to pass through an intersection of the space formed along the pixel arrangement direction of the pixel column, and the space formed along the pixel arrangement direction of the pixel row.

9. The transflective display device according to claim 6, wherein
   the wiring is a scanning line which is formed for each pixel row with respect to a matrix arrangement of the unit pixels, and through which signals for selecting the pixel units are transmitted, and
   the scanning line is wired to avoid the space formed between pixel units along a pixel arrangement direction of the pixel row.

10. The transflective display device according to claim 9, wherein
   in a space between pixel units adjacent in the pixel arrangement direction of a pixel column, the scanning line is wired to pass through an intersection of the space formed along the pixel arrangement direction of the pixel row, and the space formed along the pixel arrangement direction of the pixel column.

11. The transflective display device according to claim 1, wherein the pixel units have a memory function.

12. The transflective display device according to claim 11, wherein the pixel units have a memory unit that stores data.

13. The transflective display device according to claim 11, wherein the pixel units use a memory-type liquid crystal.

14. An electronic apparatus having a transflective display device, the transflective display device comprising:
   a first substrate on which a first orientation film and pixel units are provided, where in a plane of the first substrate a Y direction and a X direction are perpendicular to each other, and a Z direction is perpendicular to the plane of the first substrate;
   a second substrate on which a second orientation film and a transparent electrode that is opposite to the reflective electrodes are provided; and
   a liquid crystal layer including a plurality of liquid crystal molecules provided between the first substrate and the second substrate, a direction of long axis of the liquid crystal molecules being parallel to surfaces of the first and second orientation films and twisted between the first substrate and the second substrate,
   wherein each of the pixel units includes a plurality of sub-pixels arranged in the X direction;
   wherein each of the sub-pixels includes:
      a color filter corresponding to a color of the sub-pixel; and
      a reflective electrode, with spaces existing between reflective electrodes of adjacent sub-pixels,
   wherein electrodes for driving the liquid crystal layer are provided on a liquid crystal layer side of the first substrate except in a space between adjacent reflective electrodes,
   wherein a light shielding member is provided in at least one of a first space and a second space, and is not provided in a third space, the first space being a space between adjacent pixel units in the X direction, the second space being a space between adjacent sub-pixels within the same pixel unit in the X direction, the third space being a space between adjacent pixel units in the Y direction,
   wherein the reflective electrode is configured to perform reflective display, and wherein the third space is used to perform transmissive display.

15. A method of driving a transflective display device, the transflective display device a first substrate on which a first orientation film and pixel units are provided, where in a plane of the first substrate a Y direction and a X direction are perpendicular to each other, and a Z direction is perpendicular to the plane of the first substrate;

a second substrate on which a second orientation film and a transparent electrode that is opposite to the reflective electrodes are provided, and a liquid crystal layer including a plurality of liquid crystal molecules provided between the first substrate and the second substrate, wherein each of the pixel units includes a plurality of sub-pixels arranged in the X direction;

wherein each of the sub-pixels includes:
- a color filter corresponding to a color of the sub-pixel; and
- a reflective electrode, with spaces existing between reflective electrodes of adjacent sub-pixels, wherein electrodes for driving the liquid crystal layer are provided on a liquid crystal layer side of the first substrate except in a space between adjacent reflective electrodes, wherein a light shielding member is provided in at least one of a first space and a second space, and is not provided in a third space, the first space being a space between adjacent pixel units in the X direction, the second space being a space between adjacent sub-pixels within the same pixel unit in the X direction, the third space being a space between adjacent pixel units in the Y direction, the method comprising:

performing reflective display by the reflective electrodes; and performing transmissive display using the third space wherein a direction of long axis of the liquid crystal molecules is parallel to surfaces of the first and second orientation films and twisted between the first substrate and the second substrate.

* * * * *